United States Patent [19]
Huang

[11] Patent Number: 5,841,775
[45] Date of Patent: Nov. 24, 1998

[54] SCALABLE SWITCHING NETWORK

[76] Inventor: Alan Huang, 682 Sixteenth Ave., Menlo Park, Calif. 94025

[21] Appl. No.: 680,680

[22] Filed: Jul. 16, 1996

[51] Int. Cl.$^6$ ..................................................... H04L 12/54
[52] U.S. Cl. ...................... 370/422; 370/388; 340/825.29
[58] Field of Search ..................................... 370/370, 371, 370/372, 381, 387, 388, 400, 367, 380, 386, 392, 427, 902; 340/825.03, 825.8, 825.89

[56] References Cited

U.S. PATENT DOCUMENTS

| | | | |
|---|---|---|---|
| 4,516,238 | 5/1985 | Huang et al. | 370/60 |
| 4,542,497 | 9/1985 | Huang et al. | 370/60 |
| 4,891,803 | 1/1990 | Huang et al. | 370/60 |
| 5,179,551 | 1/1993 | Turner | 370/388 |
| 5,263,121 | 11/1993 | Melsa et al. | 370/388 |
| 5,369,400 | 11/1994 | Bowdon | 370/388 |
| 5,390,178 | 2/1995 | Hunter | 370/388 |

OTHER PUBLICATIONS 5.3.1, Nov. 26, 1984, "Starlite: A Wideband Digital Switch" by Alan Huang and Scott Knauer.

5.1.1, Nov. 26, 1984, "A Survey of Interconnectional Networks" by Robert McMillen.

*Primary Examiner*—Hassan Kizou
*Assistant Examiner*—A. Bnimoussa
*Attorney, Agent, or Firm*—Edward J. Radlo

[57] ABSTRACT

A N input and N output, scalable switching network (80) is implemented with an array of log base x of N rows and N/x columns of routers (40–68); where each router has 2x ports and where the rows of routers are connected to each other via a blocking compensated cyclic group mapping interconnect (49 and 59). A N input and N output, bi-directional scalable switching network (90) is implemented with an array of log base x of (N/2) rows and (N/2)/x columns of routers (40–68); where each router has 2x ports, and where the rows of routers are connected to each other via a blocking compensated cyclic group mapping interconnect (49 and 59). The routers provide destination routing. The levels of blocking compensated cyclic group mapping interconnect provide connectivity between the rows of routers. The internal connectivity of the scalable switching network (80) or the bi-directional scalable switching network (90) can be enhanced (82 and 92) by inserting at least one additional level of mapping interconnect (69) and row of routers (70–78). The external connectivity can be enhanced by providing alternate routes to (128) and from (124) various destinations. Fault tolerance (116) can be achieved by using dynamic routing to take advantage of the enhanced internal or external connectivity to route around faults. Input load balancing (124), internal load balancing (118), output load balancing (128), delay reduction (120), and jitter reduction (122) can be achieved by having the routers load balance between the equivalent routes provided by the enhanced internal or external connectivity. Shared distributed output buffering can be achieved by implementing flow control between the routers (115). Remote initialization, monitoring, and updating of the scalable switching network can be achieved by assigning each router (40–78) an IP address, and accessing the routers via a computer network such as the Internet.

19 Claims, 16 Drawing Sheets

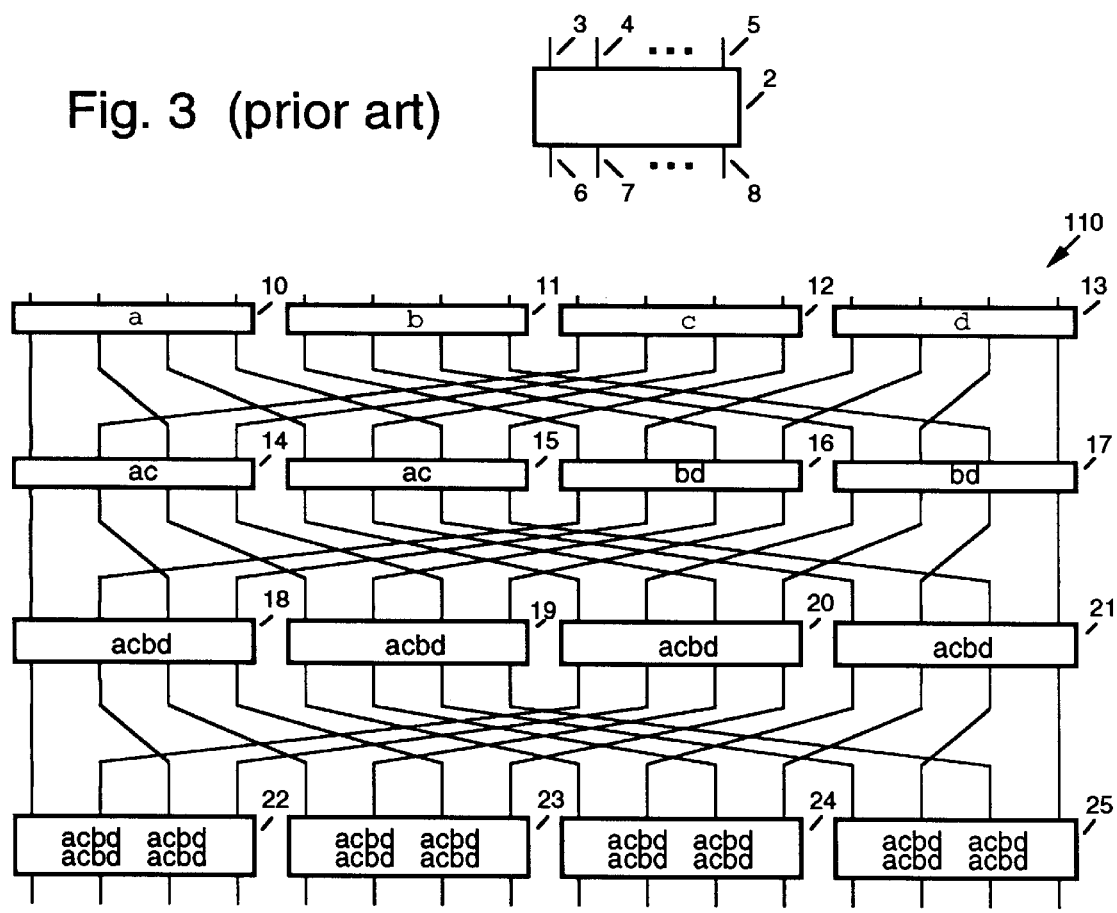
Fig. 3 (prior art)
Fig. 4
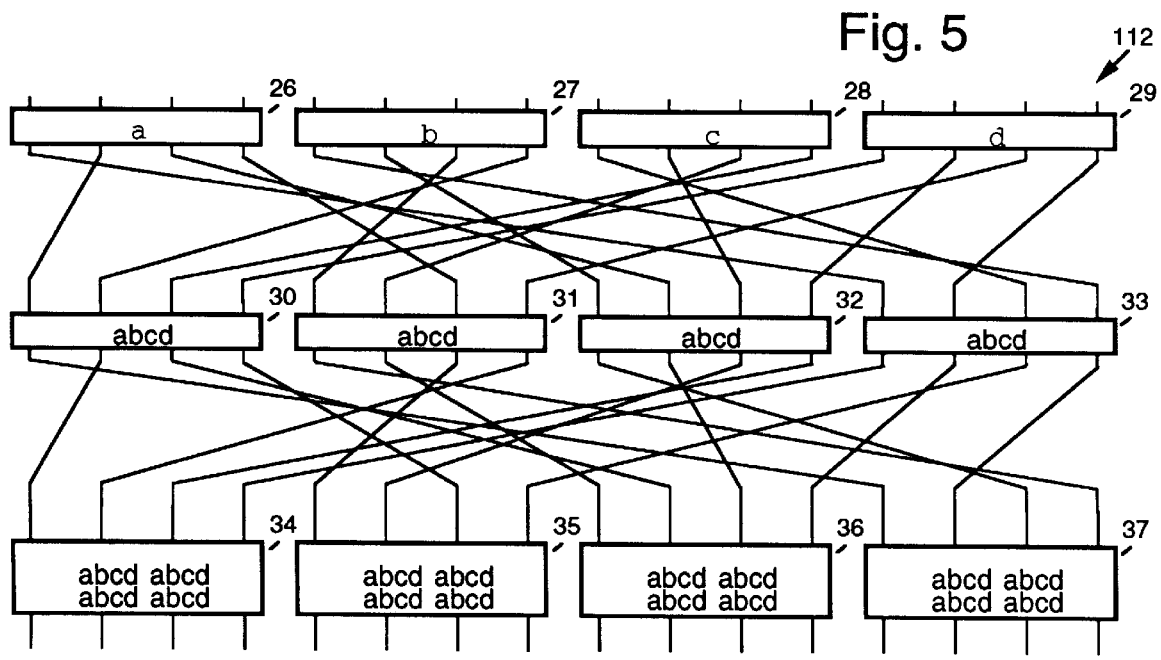
Fig. 5

```
include <stdio.h> define fanin    3            /* fan in of router */
define n        27           /* max inputs */
#define maxr     n/fanin      /* max number of routers */
define mgene    27           /* next >= power of fanin */ int m, c;                     /* multiplier and constant */
int i, r, level, gene;        /* input, router, level, gene */
int gtest, ggtest;            /* gene test flags */
int tr, tlevel, tlog;         /* temp router, level, log */ int A[maxr][mgene];           /* router array */
int B[maxr][mgene];           /* router array */
int nA[maxr], nB[maxr];       /* router array pointers */
int map[n];                   /* mapping */
int nmap[maxr];               /* map router counter */
int mod(), gen1(), gen2();

main ()
{
for (m=2; m<=n; m++) {                        /* vary multipler */ for (c=0; c<n; c+=fanin)    {                 /* vary constant */

/* init router gene pool */
for (r=0; r<n/fanin; r++) {A[r][0]=r; nA[r]=1; nmap[r]= 0;} gen1();                                       /* generate map */

/* determine number of router levels needed */
tlevel = fanin; tlog = 1;
while (n > tlevel) {tlevel *= tlevel; tlog++;}

/* do for number of mapping levels */
for (level=0; level<tlog-1; level++) {
```

Fig. 20

```
/* transfer array A to B via mapping */
for (r=0; r<maxr; r++) nB[r] = 0;
for (i=0; i<n; i++)
        for (gene=0; gene<nA[i/fanin]; gene++)
                {B[map[i]][nB[map[i]]]= A[i/fanin][gene]; nB[map[i]]++;}

/* move array B to A */
for (r=0; r<n/fanin; r++)
        for (gene=0; gene<nB[r]; gene++) A[r][gene]=B[r][gene];
for (r=0; r<maxr; r++) nA[r]=nB[r];

}                                                               /* end level        */

/* test gene pool */
gtest=0;
for (r=0; r<maxr; r++)
        {gtest = 0;
        for (i=0; i<maxr; i++)
                {ggtest = 0;
                for (gene=0; gene<nA[r]; gene++)
                        if(B[r][gene] == i) ggtest=1;
                if (ggtest != 1) gtest = 1;}}
if (gtest == 0)
        {printf("\nmod(%2d*i+%2d),%2d) levels of mapping =%3d\n",
                m, c, n, level);
        for (i=0; i<n; i++) printf("%2d,", map[i]);}

}                                                               /*    end c         */

}                                                               /*    end m         */

}                                                               /*    end main      */
```

Fig. 21

```
gen1()                                  /* symmetric generator */
{
extern int i, tr, m, c, nmap[], map[];

for (i=0; i<n/2; i++)
        {tr = mod((m * i + c), n)/fanin;
        for (r=0; r<maxr; r++)
                if (nmap[mod(tr+r,maxr)] < fanin)
                        {map[i] = mod(tr+r, maxr);
                        nmap[mod(tr+r, maxr)]++; break;}}
for (i=n-1; i>=n/2; i--)
        {tr = (n - 1 - mod((m * (n -i -1) + c), n))/fanin;
        for (r=0; r<maxr; r++)
                if (nmap[mod(tr-r,maxr)] < fanin)
                        {map[i] = mod(tr-r, maxr);
                        nmap[mod(tr-r, maxr)]++; break;}}
} gen2()                                  /* asymmetric generator */
{
extern int i, tr, m, c, nmap[], map[];

for (i=0; i<n; i++)
        {tr = mod((m * i + c), n)/fanin;
        for (r=0; r<maxr; r++)
                if (nmap[mod(tr+r,maxr)] < fanin)
                        {map[i] = mod(tr+r, maxr);
                        nmap[mod(tr+r, maxr)]++; break;}}
} mod(a, b)                               /*      mod function      */
int a, b;
{
int x; x = a % b;
if (a < 0) x = b + x;
return(x);
}
```

SCALABLE SWITCHING NETWORK

TECHNICAL FIELD

This invention relates to switching networks, specifically a switching network which can be scaled to accept an arbitrary number of inputs and outputs.

BACKGROUND ART

It is difficult to design a switching network which is scalable, fault tolerant, load balanced, robust to burstiness, and having low latency, and low jitter.

There are two basic approaches to provide the connectivity needed to support switching or routing. One approach uses a memory based architecture to provide a time based connectivity. The other approach uses a switching fabric architecture to provide a spatial connectivity. This is discussed in "Gigabit Networking" by Craig Partridge (Addison-Wesley, 1994, ISBN 0-201-56333-9). The memory based approach reads the packets into a computer memory and then outputs the packets via various outputs. Most current ATM (asynchronous transfer mode) switches and packet routers are based on a memory based approach. These switches share buffers but they are not scalable since they have a memory bottleneck. Switching fabrics such as the crossbar ($N^2$), Batcher/Bayan ($O(\log_2 N)^2$), Buffered Bayan ($\log_2 N$), and Omega ($\log_2 N$) networks are implemented with a fabric of switching nodes. They are scalable but they do not share buffers. There are two basic approaches to provide the routing needed to support switching or routing. One approach is destination based, such as the Internet. The other approach is path based, such as the telephone network. Destination routing is based on a table lookup at each decision point. It is flexible since it is loosely coupled with the topology of the network, however the routing decisions are more complex since knowledge of the overall network is required at each decision point. In path based routing all the routing decisions are pre-determined and represented by the telephone number or address. This is tightly coupled to the topology of the network; however, the routing decisions at each decision point are simpler since they do not require any local or global information.

All switches, whether they are circuit switched, packet switched, memory based, fabric based, destination routed, or path routed, face a common set of problems.

One problem is input congestion. This happens when too much traffic is directed to the same input. Current approaches use bandwidth reservation or network flow control.

Another problem is internal congestion. This happens when there is insufficient bi-sectional or throughput bandwidth. Current approaches add connectivity or buffers.

Another problem is output congestion. This happens when too much traffic is directed towards the same output. The current approaches add output buffers or use network flow control.

Another problem is fault tolerance. This happens when part of the switch or network fails. One approach to this problem uses a tandem of switches where one switch backs up a second switch as a "hot standby." This requires twice the amount of hardware. Another approach uses majority voting. This uses at least three switches in parallel and determines each output by a majority vote. This requires at least three times the amount of hardware.

OBJECTS AND ADVANTAGES

Accordingly, several objects and advantages of my invention are:

(a) to provide a switching network with a scalable number of inputs and outputs;

(b) to provide a switching network with a minimum number of levels of routing;

(c) to provide a switching network with a minimum number of modules;

(d) to provide a switching network which is fault tolerant;

(e) to provide a switching network which is internally load balanced;

(f) to provide a switching network with reduced packet delay;

(g) to provide a switching network with reduced packet jitter;

(h) to provide a switching network which can exploit enhanced input connectivity for fault tolerance, input load balancing, and internal load balancing;

(i) to provide a switching network which can exploit enhanced output connectivity for fault tolerance, output load balancing, and internal load balancing;

(j) to provide a switching network with shared distributed output buffering; and (k) to provide a switching network which can be remotely configured, maintained, and monitored.

Further objects and advantages of my invention will become apparent from a consideration of the drawings and ensuing description.

DISCLOSURE OF INVENTION

A scalable switching network (80) or a bi-directional scalable switching network (90) is achieved by using a network of routers to implement a scalable switch.

An N input and N output, scalable switching network (80) is implemented with $\log_x N$ rows of routers (40–48, 50–58, and 60–68) and $\log_x N-1$ levels of blocking compensated cyclic group based mapping interconnects (49 and 59). Each row of routers has N/x routers and each router has x top and x bottom ports. Each level of mapping interconnect has N upper and N lower ports. The bottom ports of all but a last row of routers is connected to the upper ports of a mapping interconnect. The top ports of all but a first row of routers is connected to the lower ports of a mapping interconnect. The top ports of the first row of routers (40–48) are used as inputs for the scalable switching network. The bottom ports of the last row of routers (60–68) are used as outputs for the scalable switching network. Destination based routing guides the packets through the scalable switching network. The blocking compensated cyclic group based mapping interconnects provide the connectivity. 4

A N input and N output, bi-directional scalable switching network (90) is implemented with $\log_x (N/2)$ rows of routers (40–48, 50–58, and 60–68) and $\log_x(N/2) -1$ levels of blocking compensated cyclic group based mapping interconnects (49 and 59). Each row of routers has (N/2)/x routers and each router has x top and x bottom full duplex ports. Each level of mapping interconnect has N/2 upper and N/2 lower ports. The bottom ports of all but a last row of routers is connected to the upper ports of a mapping interconnect. The top ports of all but a first row of routers is connected to the lower ports of a mapping interconnect. The top full duplex ports of the first row of routers (40–48) and the bottom full duplex ports of the last row of routers (60–68) are used for both the inputs and the outputs for the bi-directional scalable switching network. Destination based routing guides the packets through the bi-directional scalable switching network. The blocking compensated cyclic group based mapping interconnects provide the connectivity in both directions. Fault tolerance (FIG. 7) for scalable switching network (80), enhanced scalable switching network (82), bi-directional scalable switching network (90), or enhanced bi-directional scalable switching network (92) is achieved by using dynamic routing to select alternate pathes produced by enhanced internal (FIG. 2), external input connectivity (FIG. 11), or exernal output connectivity (FIG. 13) when there is a link or router failure.

Internal load balancing (FIG. 8) for scalable switching network (80), enhanced scalable switching network (82), bi-directional scalable switching network (90), or enhanced bi-directional scalable switching network (92) is achieved by load balancing across equivalent paths produced by enhanced internal (FIG. 2), external input connectivity (FIG. 11), or external output connectivity (FIG. 13).

Reduced packet delay (FIG. 9) for scalable switching network (80), enhanced scalable switching network (82), bi-directional scalable switching network (90), or enhanced bi-directional scalable switching network (92) is achieved by load balancing across equivalent paths produced by enhanced internal (FIG. 2), external input connectivity (FIG. 11) or external output connectivity (FIG. 13) to facilitate the parallel processing and parallel communications of packets.

Reduced packet jitter (FIG. 10) for scalable switching network (80), enhanced scalable switching network (82), bi-directional scalable switching network (90), or enhanced bi-directional scalable switching network (92) is achieved by load balancing across equivalent paths produced by enhanced internal (FIG. 2), external input connectivity (FIG. 11) or external output connectivity (FIG. 13) to de-correlate the destinations of each router's packets.

An input load balancing (FIG. 11) for scalable switching network (80), enhanced scalable switching network (82), bi-directional scalable switching network (90), or enhanced bi-directional scalable switching network (92) is achieved by load balancing across equivalent paths produced by enhanced external input connectivity.

An output load balancing (FIG. 13) for scalable switching network (80), enhanced scalable switching network (82), bi-directional scalable switching network (90), or enhanced bi-directional scalable switching network (92) is achieved by load balancing across equivalent paths produced by enhanced external output connectivity.

A shared distributed output buffered scalable switching network (80), enhanced scalable switching network (82), bi-directional scalable switching network (90), or enhanced bi-directional scalable switching network (92) is achieved by having each router (115) detect a potential buffer overflow condition, request a neighboring router to reduce its packet flow if such an overflow condition exists, and reduce packet flow to a neighboring router in response to a request to reduce packet flow.

Remote initialization, monitoring, and updating is achieved by assigning each router an IP address and installing protocols such as BOOTP (Bootstrap Protocol) and SNMP (Simple Network Management Protocol) in the routers and attaching the scalable switching network (80), enhanced scalable switching network (82), bi-directional scalable switching network (90), or enhanced bi-directional scalable switching network (92) to a computer network such as the Internet.

BRIEF DESCRIPTION OF THE DRAWINGS

These and other more detailed and specific objects and features of the present invention are more fully disclosed in the following specifications, reference being had to the accompanying drawings, in which:

FIG. 3 is a block diagram of a prior art router 2.

FIG. 4 is a block diagram of a perfect shuffle mapping interconnect based switching network 110 with a blocking degraded mixing capability.

FIG. 5 is a block diagram of a switching network 112 of the present invention with a blocking compensated mapping interconnect based on cyclic group permutations.

FIGS. 20, 21, and 22 show a C program of the present invention to generate and test complete cyclic group permutations and smoothed cyclic sub-group permutations needed scalable switching scalable switching network.

FIG. 26 shows a 512 port mapping interconnect for scalable switching networks of the present invention which can be used to build a 512 input scalable switching network or a 1024 bi-directional scalable switching network.

DETAILED DESCRIPTION OF THE PREFERRED EMBODIMENTS

A switching fabric of routers is used to implement a scalable switching network. The switching fabric supplies the connectivity. The routers supply the routing, maintenance, and administrative functions. The switching fabric and routers cooperate to reduce hardware, delay, and jitter; and provide fault tolerance, internal load balancing, input load balancing, output load balancing, and shared distributed output buffering. The scalable switching networks can be used to switch computer or telecommunications packets having protocols such as IP, ATM, and X.25. The scalable switching networks can also be used to switch telecommunications data such as time slots or frame relay frames.

Figure 1:
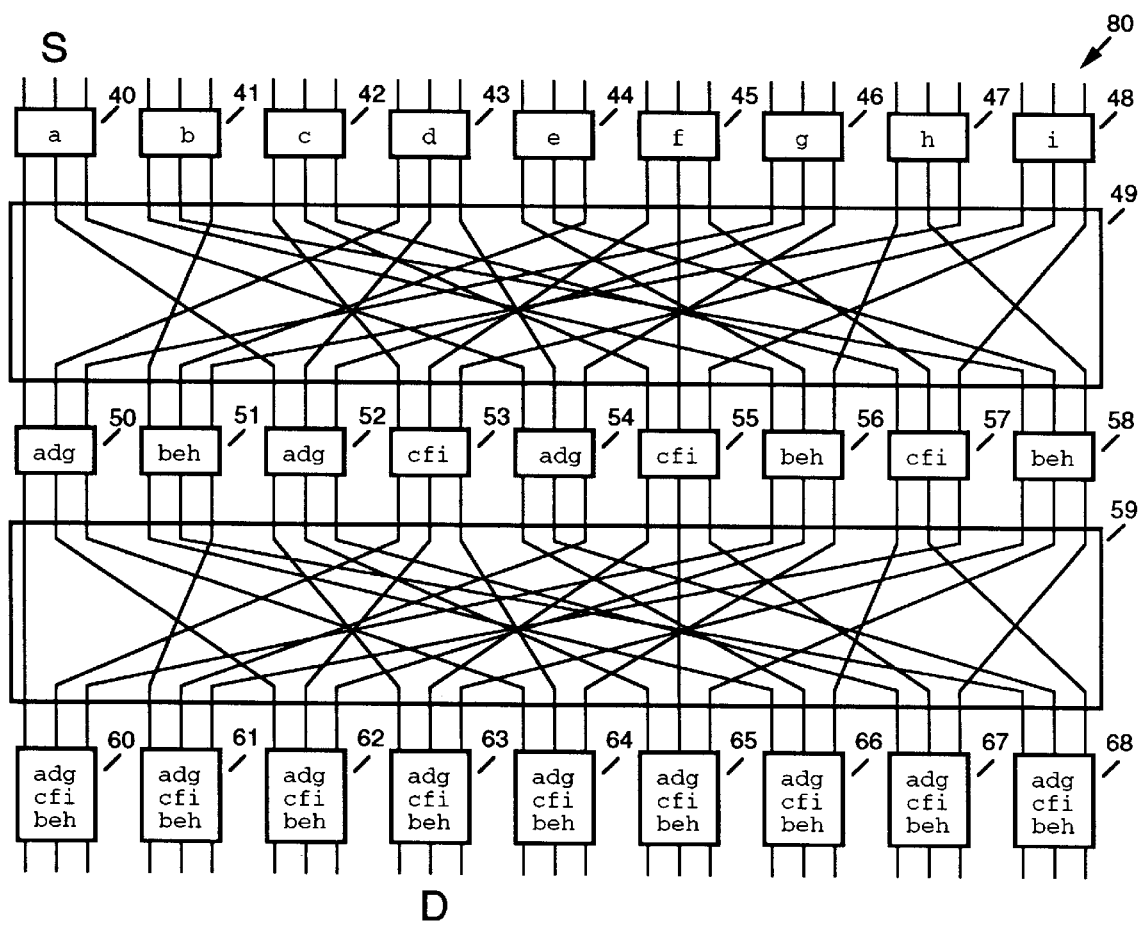
FIG. 1 is a block diagram of a scalable switching network 80 of the present invention.

A scalable switching network 80 is shown in FIG. 1. Modules 40–48, 50–58, and 60–68 are TCP/IP routers each with a fanin and fanout of three. FIG. 3 (prior art) shows a generic TCP/IP router 2 suitable for use in the present invention. The ports 3, 4, 5, 6, 7, and 8 of router 2 are assumed to be full duplex and thus capable of functioning as either an input or output. A portion of the router ports; such as 3, 4, and 5 will be referred to as the top ports while the other ports; such as 6, 7, and 8 will be referred to as the bottom ports. The number of top ports is referred to as the fanin. The number of bottom ports is referred to as the fanout. The fanin and fanout are initially assumed to be equal. The internals of a TCP/IP router are discussed in detail in "TCP/IP Illustrated, Volumes 1–3" by W. Richard Stevens (Addison-Wesley, 1994, ISBN 0-201-63346-9).

Returning to FIG. 1 router 40 is connected to routers 50, 52, and 54. Router 41 is connected to routers 55, 58, and 51. Router 42 is connected to routers 53, 55, and 57. Router 43 is connected to router 50, 52, and 54. Router 44 is connected to routers 56, 58, and 51. Router 45 is connected to routers 53, 55, and 57. Router 46 is connected to routers 50, 52, and 54. Router 47 is connected to 56, 58, and 51. Router 48 is connected to routers 53, 55, and 57. These connections are accomplished by mapping interconnect 49. The upper ports of mapping interconnect 49 are connected to the bottom ports of routers 40–48. The lower ports of mapping interconnect 49 are connected to the top ports of routers 50–58. Router 50 is connected to routers 60, 62, and 64. Router 51 is connected to routers 65, 68, and 61. Router 52 is connected to routers 63, 65, and 67. Router 53 is connected to router 60, 62, and 64. Router 54 is connected to routers 66, 68, and 61. Router 55 is connected to routers 63, 65, and 67. Router 56 is connected to routers 60, 62, and 64. Router 57 is connected to 66, 68, and 61. Router 58 is connected to routers 63, 65, and 67. These connections are accomplished by mapping interconnect 59. The upper ports of mapping interconnect 59 are connected to the bottom ports of routers 50–58. The lower ports of mapping interconnect 59 are connected to the top ports of routers 60–68.

The three inputs to router 40 are represented by the gene a. The inputs to routers 41–48 are respectively represented by the genes b, c, d, e, f g, h, and i. Router 50 inherits the genes adg from routers 40, 43, and 46 to which it is connected. Routers 51–58 inherit genes beh, adg, cfi, adg, cfi, beh, cfi, and beh respectively from the routers to which they are connected. Routers 60–68 each inherit genes adgcfibeh from the routers to which they are connected.

The genes indicate the span of the connectivity of each router. Router 53's genes cfi indicate that router 53 is connected to all the inputs of routers 42, 45, and 48. Similarly, router 60's genes adgcfibeh indicate that router 60 is connected to all inputs of routers 40–48. Similarly, routers 61–68 are all connected to all the inputs of routers 40–48.

The gene pools indicate the connectivity. A method of routing is needed to direct a packet through this network. The routing needed to make use of this connectivity is provided by TCP/IP. Each router periodically broadcasts its routing table to its neighbors. Each router then builds a map of the network. The routers use this map to determine the next best hop for each destination. Details about how these tables are built, maintained, and used by internal routing algorithms such as Routing Information Protocol (RIP) and Open Shortest Path First (OSPF); and external routing algorithms such as Exterior Gateways Protocol (EGP), and Border Gateway Protocol (BGP) can be found in "*Routing in the Internet,*" by Christian Huitema (Prentice Hall, 1995, ISBN 0-13-132192-7).

As an example, suppose a packet from a source S entering router 40 wishes to be routed to a destination D connected to router 63. Router 40 consults its routing table and determines that the packet should be forwarded to router 52. Router 52 then consults its routing table and determines that the packet should be forwarded to router 63.

Any of the inputs of routers 40–48 can be routed to any of the outputs of routers 60–68 with $\log_{fanin} N = \log_3 27 = 3$ levels of routers and $\log_{fanin} N - 1 = \log_3 27 - 1 = 2$ levels of mapping interconnections; where N is the number of inputs and fanin is the number of top and bottom router ports.

Such a switching network can be made scalable in the number of inputs and outputs. More routers can be added to make it wider to handle more inputs and outputs. More levels of routers and mapping interconnections can be added to supply the needed connectivity.

Extra levels of mapping interconnect and rows of routers can be added to enhance the connectivity and provide for additional routing. This enhanced connectivity and additional routing can be used for fault tolerance, internal load balancing, delay reduction, and jitter reduction.

Figure 2:
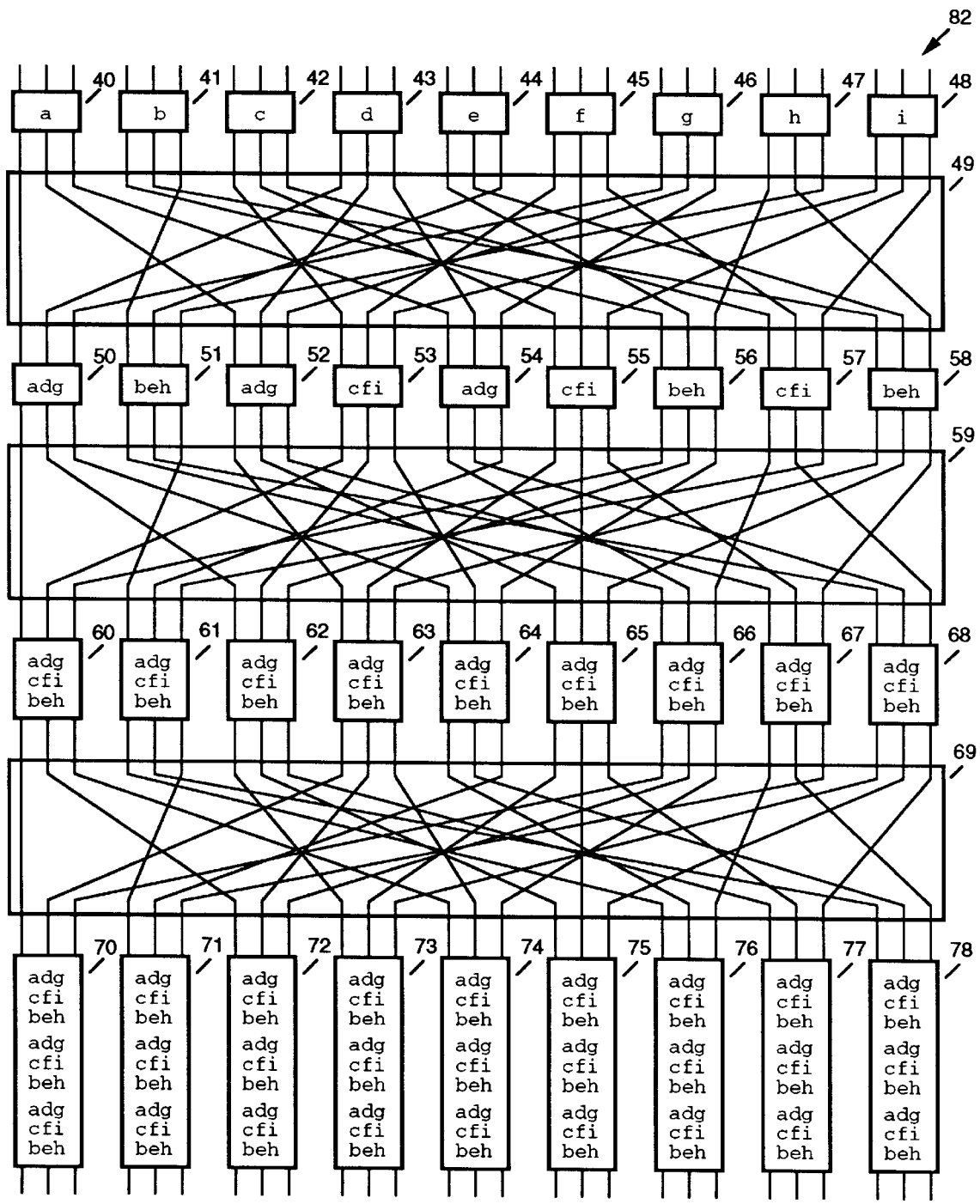
FIG. 2 is a block diagram of a connectivity enhanced scalable switching network 82 of the present invention with fault tolerance, internal load balancing, reduced delay, and reduced jitter.

A scalable switching network 82 with enhanced connectivity is shown in FIG. 2. Router 60 is connected to routers 70, 72, and 74. Router 61 is connected to routers 75, 78, and 71. Router 62 is connected to routers 73, 75, and 77. Router 63 is connected to router 70, 72, and 74. Router 64 is connected to routers 76, 78, and 71. Router 65 is connected to routers 73, 75, and 77. Router 66 is connected to routers 70, 72, and 74. Router 67 is connected to 76, 78, and 71. Router 68 is connected to routers 73, 75, and 77. These connections are accomplished by mapping interconnect 69. The upper ports of mapping interconnect 69 are connected to the bottom ports of routers 50–58. The lower ports of mapping interconnect 69 are connected to the top ports of routers 70–78. Router 70's gene pool adgcfibeh, adgcfibeh, and adgcfibeh indicate that router 70 can connect to any input of routers 40–48 via three different routes. Routers 71–78 have a similar gene pool. One additional level of mapping interconnect and a row of routers each with a fanin of three, thus provides a three way redundancy.

The routing needed to take advantage of this enhanced connectivity is provided by TCP/IP's destination based routing and dynamic routing. Destination based routing will route packets through the additional level of mapping interconnect and row of routers. Dynamic routing will update the routing table to reflect the enhanced connectivity. In dynamic routing each router monitors the connectivity of routers to which it is connected; updates its routing table to reflect any change in this connectivity; periodically broadcasts its routing table to its neighbors; builds a map of the network based on the broadcast routing tables; extracts the best path to various destinations from this network map; and updates its routing table.

Destination based routing and dynamic routing can be modified to take advantage of the enhanced connectivity of the enhanced scalable switching network (82). A router can extract for the network map all the equivalent paths to each destination; store the next hop of these equivalents in the routing table; and use the equivalent path when needed. In the case of RIP (Routing Information Protocol) routing, the number of hops can be used to determine the equivalence of various paths. In the case of OSPF (Open Shortest Path First) routing, a modification of Dijkstra's shortest path first algorithm can be used. See *"Routing in the Internet,"* by Christian Huitema.

The enhanced connectivity and additional routing can be used to make the scalable switching network 82 fault tolerant. The previously discussed, scalable switching network 80 in FIG. 1 consisting of routers 40–48, 50–58, and 60–68 and mapping interconnections 49 and 59; provides only one route between any input on routers 40–48 to any output of routers 60–68. The failure of router 52 for example would make it impossible for an input of router 40 to reach router 63.

Figure 7:
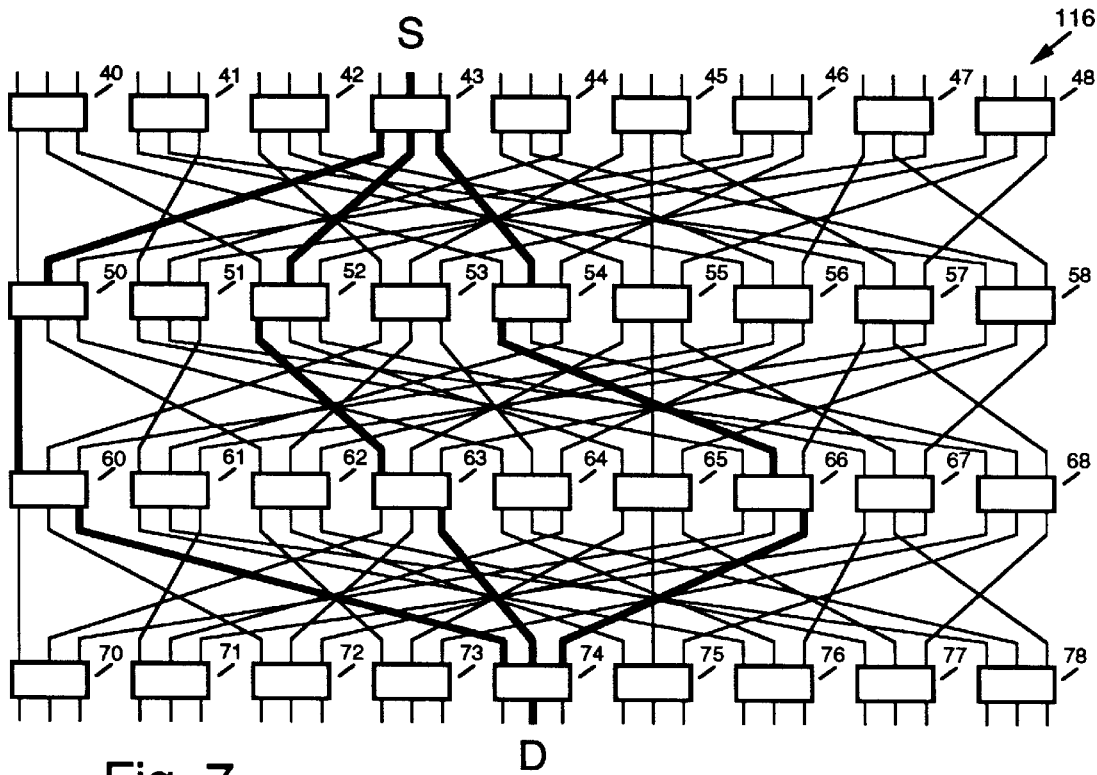
FIG. 7 is a block diagram of a fault tolerant scalable switching network 116 of the present invention.

An example of fault tolerance is shown in FIG. 7, suppose a packet from source S on one of the inputs of router 43 wanted to reach a destination D connected to router 74. The packet could be routed via routers 43, 50, 60, and 73; via routers 43, 52, 63, and 74; or via routers 43, 54, 66, and 74. If router 63 were to fail then the failure would be detected by neighboring routers 52, 55, 58, 70, 72, and 74. The neighboring routers mark on their routing tables that router 63 is unreachable. This information is eventually broadcast to the other routers. The routers each update their network maps with this information. The path from router 43 to router 74 via routers 52 and 63 would no longer be valid. Subsequent traffic is diverted to be either through routers 43, 50, 60, 74; or routers 43, 54, 66, and 74. No further traffic is directed through router 63.

The enhanced connectivity and additional routing can be used to internally load balance scalable switching network 82. This load balancing will alleviate hot spots and increase the scalable switching network's robustness to burstiness. Routers 40–48, 50–58, 60–68, and 70–78 can be set to load balance between equivalent paths. The routers can extract the equivalent paths from the network map, store the next hop of these equivalent paths in their routing table, and select them in an alternating manner. See Multiple Path Routing in *"Routing in the Internet,"* by Christian Huitema.

Figure 8:
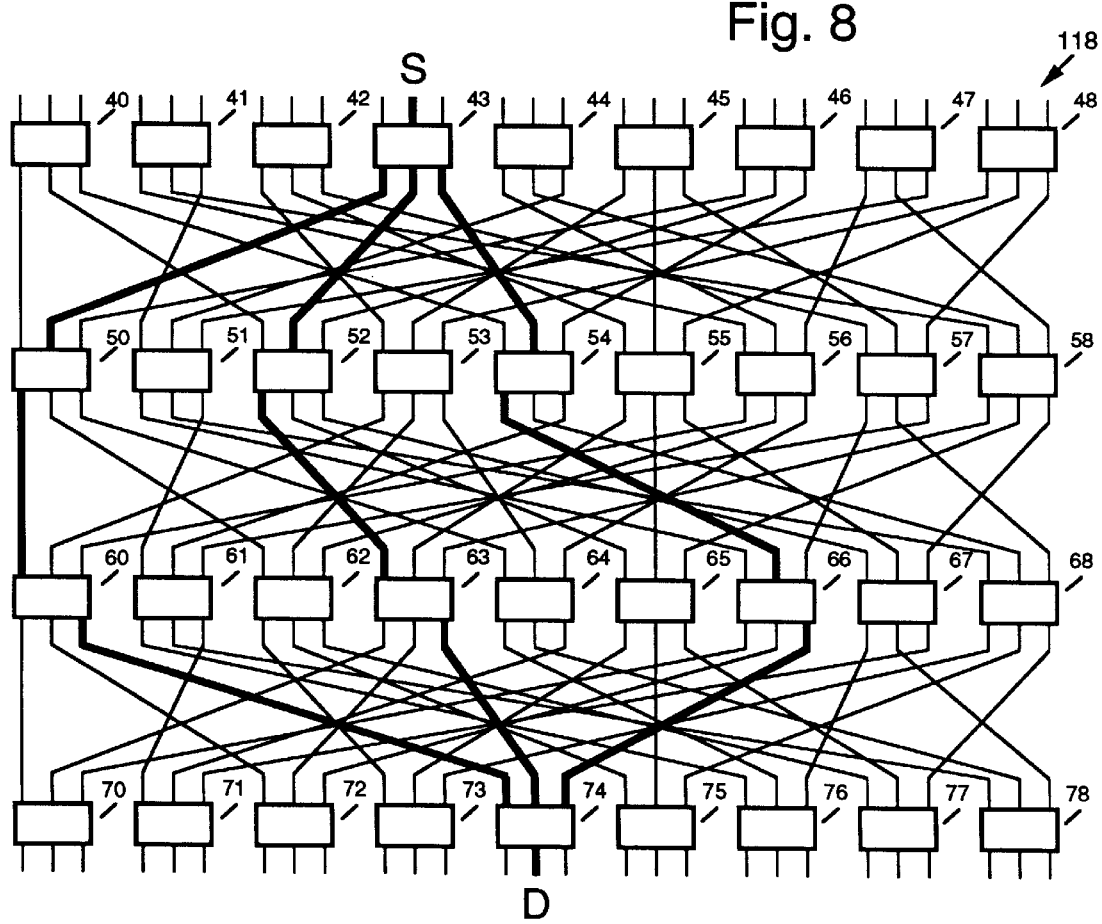
FIG. 8 is a block diagram of an internal load balanced scalable switching network 118 of the present invention.

An example of internal load balancing is shown in FIG. 8. The traffic between routers 43 and 74 is divided between routes 43, 52, 63, and 74; 43, 50, 60, and 74; and 43, 54, 66, and 74. This reduces the probability of a hot spot since the traffic is divided over three different paths. It also divides and thus reduces the effect of any burstiness.

The enhanced connectivity and additional routing can be used to reduce the delay or latency of scalable switching network 82. Routers 40–48, 50–58, 60–68, and 70–78 can be set to load balance between equivalent paths. The routers can extract the equivalent paths from the network map, store the next hop of these equivalent routes in their routing table, and select them in an alternating manner. These equivalent routes reduce the delay by dividing the packets and allowing them to be processed and communicated in parallel.

Figure 9:
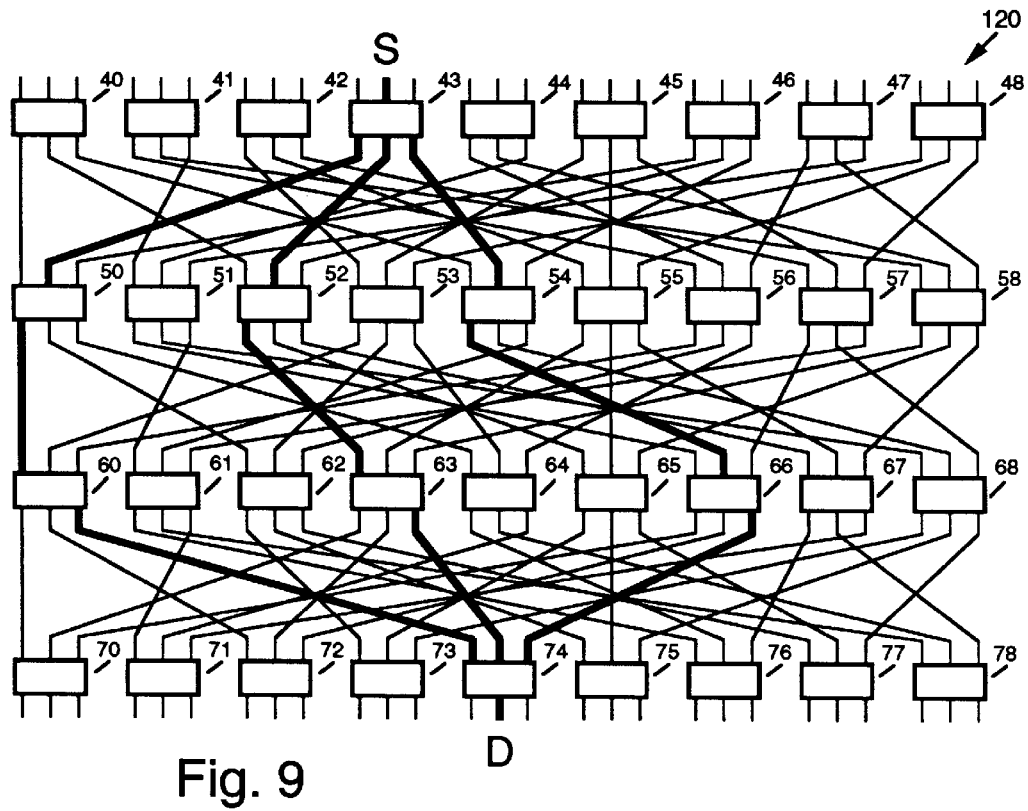
FIG. 9 is a block diagram of a reduced delay scalable switching network 120 of the present invention.

An example of delay reduction is shown in FIG. 9. Suppose some packets wish to travel from router 40 to router 63, and suppose that routers 40, 52, and 63 each require z seconds to process the packets. It then takes 3z seconds for the packets to traverse the three levels of routers. Now suppose these same packets wish to travel from router 40 to router 74 . These packets can be divided among routes 43, 52, 63, and 74; 43, 50, 60, and 74; and 43, 54, 66, and 74. Since each path now has to handle only ⅓ of the packets, the delay will be only 1/3 as long. Thus the total packet delay will be z+z/3+z/3+z seconds. This is a savings of z/3 seconds. An additional level of mapping interconnect and row of routers will thus reduce the overall delay.

The enhanced connectivity and additional routing can be used to reduce the jitter. Routers 40–48, 50–58, 60–68, and 70–78 in enhanced scalable switching network 82 can be set to load balance between equivalent paths. The routers can extract the equivalent paths from the network map, store the next hop of these equivalent paths in their routing table, and select them in an alternating manner. The spreading of packets over equivalent paths reduces the correlation between the packets in each router. This increased diversity of each router's mix of packets enhances statistical multiplexing and dilutes the effect of fluctuations in a particular packet stream. This reduces the jitter of enhanced scalable switching network (80).

Figure 10:
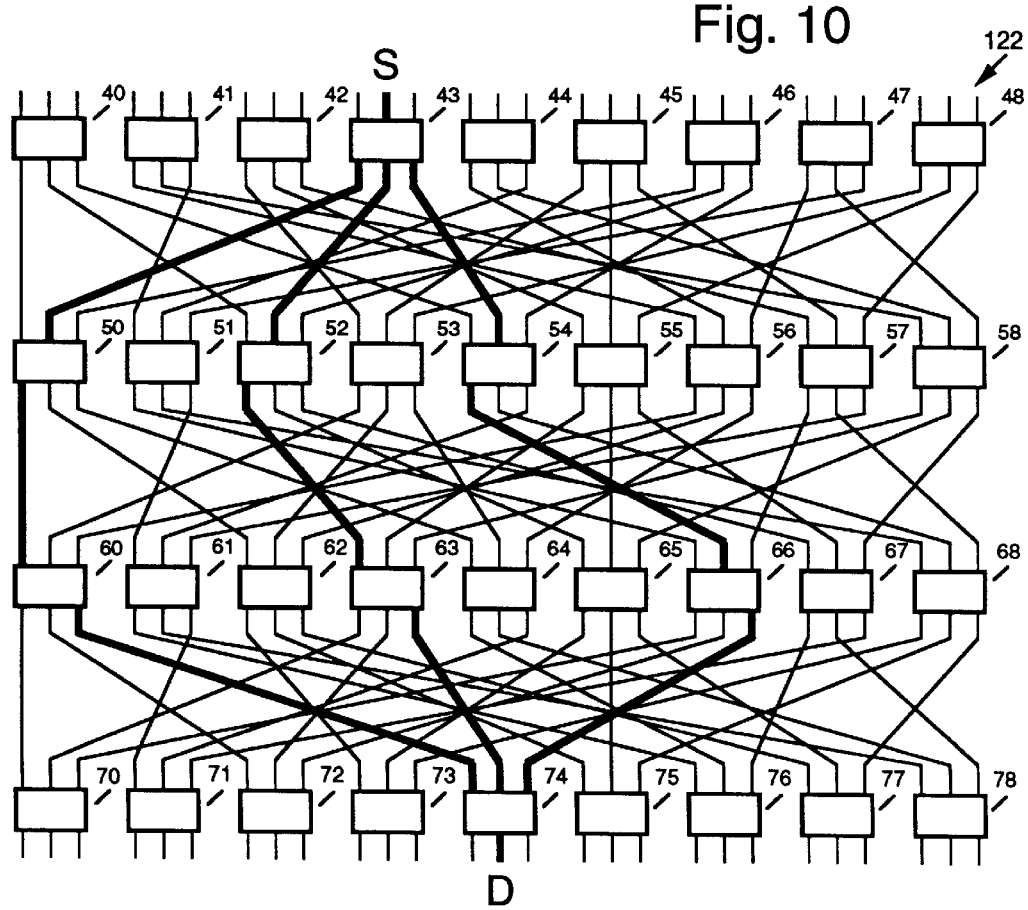
FIG. 10 is a block diagram of an jitter reduced scalable switching network 122 of the present invention.

An example of reduced jitter is shown in FIG. 10. The traffic between routers 43 and 74 is divided between routes 43, 52, 63, and 74; 43, 50, 60, and 74; and 43, 54, 66, and 74. Router 52 gets only ⅓ of the traffic between routers 43 and 74. It also gets ⅓ of the traffic from routers 40 and 46. Fluctuations in the traffic from router 43 to 74 are only ⅓ as large. The traffic from routers 40 and 46 has only ⅓ the probability of needing the same output link to router 63. This dilution of effect and diversity smoothing reduces the jitter.

The enhanced connectivity needed to support fault tolerance, internal load balancing, reduced delay, and reduced jitter is provided by the additional level of mapping interconnect and row of routers. The ability to route through such an enhanced network is provided by the destination based routing of TCP/IP. The ability to route around faults is provided by the dynamic routing of TCP/IP. The ability to load balance between the equivalent routes provided by this enhanced connectivity is provided by the multiple path routing capability of TCP/IP. Additional levels of mapping interconnect and rows of routers can be added to further enhance the connectivity if desired.

The routers which make up the scalable switching network can also recognize external input and output enhanced connectivity and take advantage of it via external routing protocols such as EGP (External Gateways' Protocols), BGP (Border Gateway Protocol), and CIDR (Classless Inter-Domain Routing). See *"Routing in the Internet,"* by Christian Huitema. This enhanced connectivity can be used for fault tolerance, internal load balancing, reduced delay, and reduced jitter. It can also be used for input and output fault tolerance; and input and output load balancing.

Figure 11:
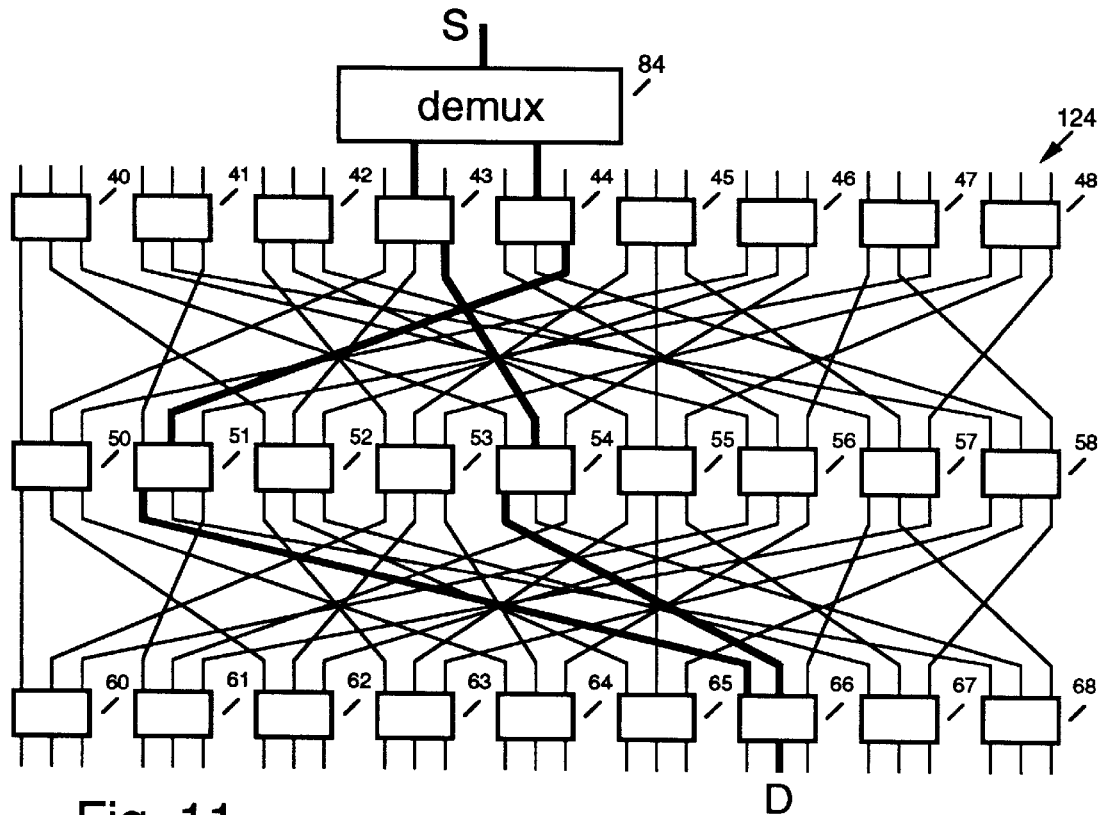
FIG. 11 is a block diagram of a scalable switching network 124 of the present invention which exploits enhanced input connectivity for fault tolerance, input load balancing, and internal load balancing.

External input redundancy can be achieved by either connecting several in-coming links from the same neighboring source S to the inputs of different input routers such as 40–48, or by connecting the outputs of a link demultiplexer such as 84 to the inputs of different input routers 40–48. Enhanced external input connectivity can be used by the scalable switching network 80 to enhance its connectivity. An example of enhanced external input connectivity is shown in FIG. 11. Traffic from source S can now reach output router 66 via two routes 43, 54, and 66; or 44, 51, and 66. This enhanced connectivity can be used for input router fault tolerance. If either of input routers 43 or 44 were to fail then the traffic could be diverted to the other input router. This enhanced connectivity can be used for input load balancing. This distributes the in-coming traffic over several input routers and helps prevent any particular input router from becoming overloaded. This can be achieved by having external network routers load balance between the two equivalent routes to output router 66. The traffic to destinations connected to router 66 from source S is then divided between input routers 43 and 44. This load balancing also reduces the delay and jitter.

Figure 12:
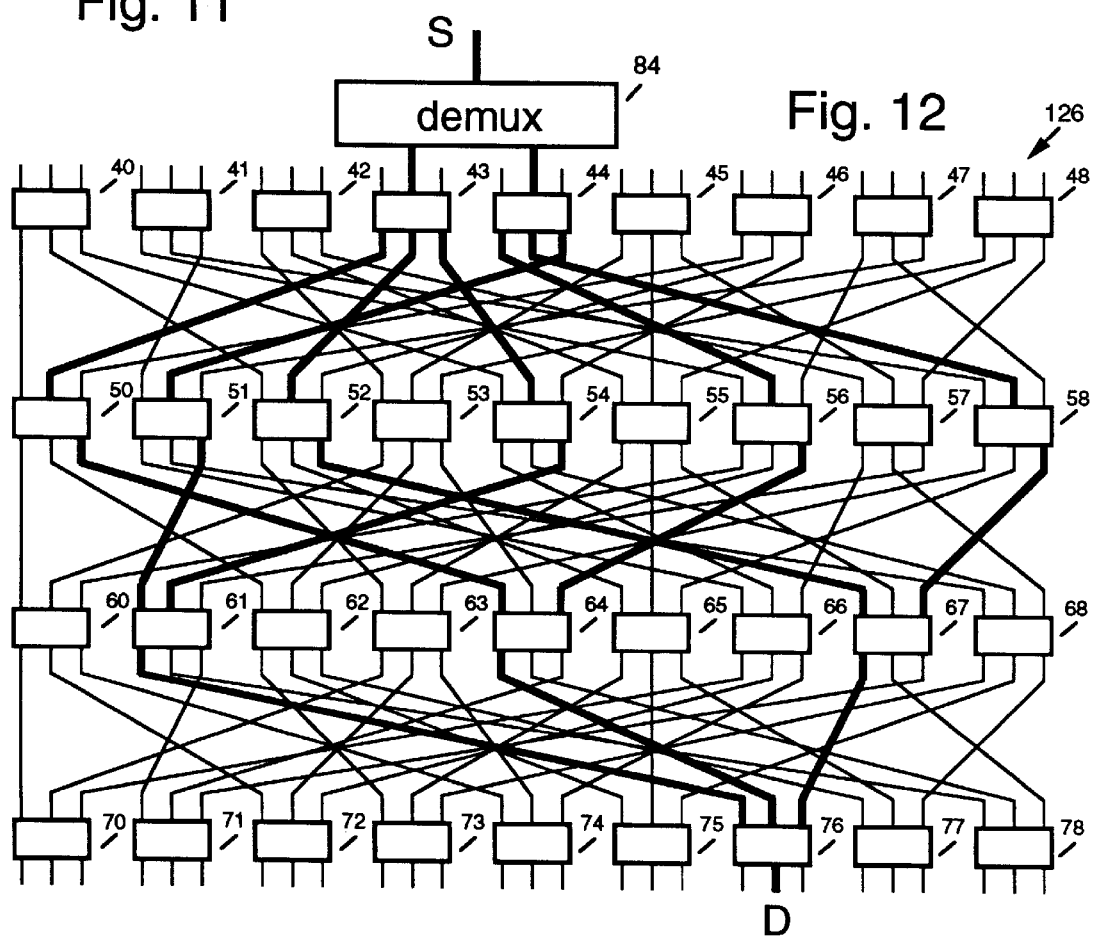
FIG. 12 is a block diagram of a scalable switching network 126 of the present invention which exploits enhanced input and internal connectivity for fault tolerance, input load balancing, and internal load balancing.

Enhanced external input connectivity combines with enhanced internal connectivity to enhance the overall connectivity. This is shown in FIG. 12. An additional level of mapping interconnect and row of routers 70–78 have been added. It is now possible to get from source S to router 76 by routers 43, 50, 64, and 76; 43, 52, 67, and 76; 43, 54, 61, and 76; 44, 51, 61, and 76; 44, 56, 64, and 76; or 44, 58, 67, and 76. This enhanced connectivity can be used or input load balancing, internal load balancing, input fault tolerance, internal fault tolerance, delay reduction, and jitter reduction.

Figure 13:
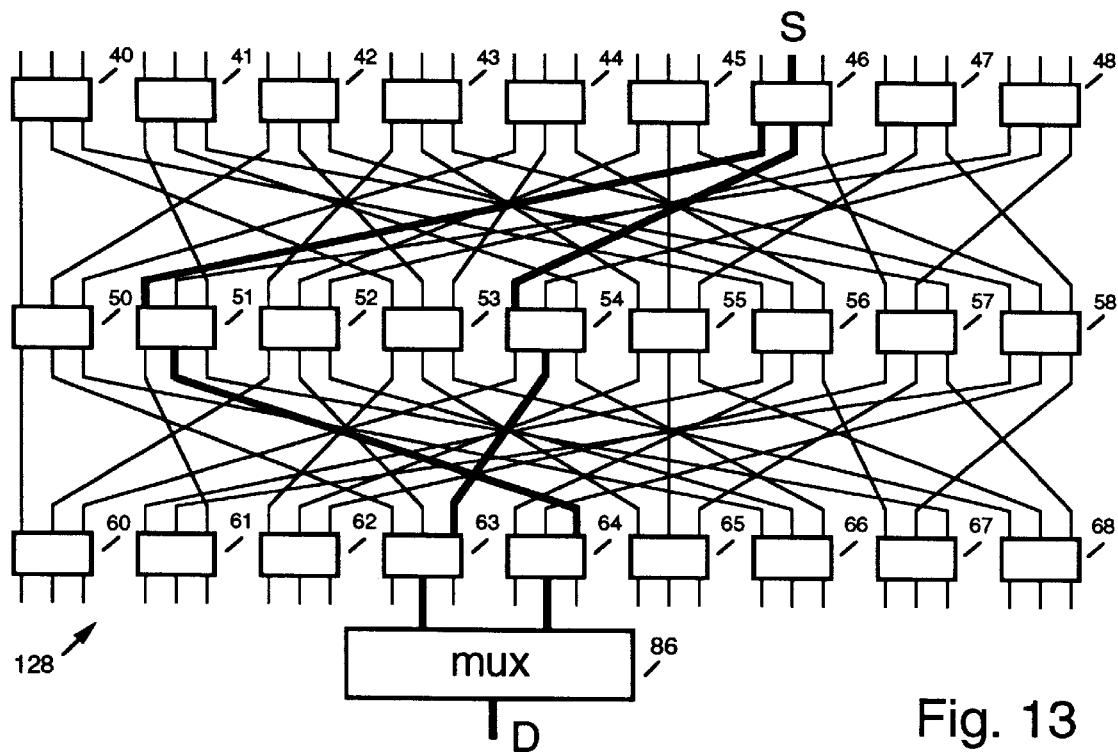
FIG. 13 is a block diagram of a scalable switching network 128 of the present invention which exploits enhanced output connectivity for fault tolerance, output load balancing, and internal load balancing.

Enhanced external output connectivity can be achieved by either connecting several out-going links to the same neighboring destination D to the outputs of different output routers such as 60–68 or by connecting the outputs of a link multiplexer such as 86 to the outputs of different input routers such as 60–68. Output routers 63 and 64 learn that they are connected to destination D. They eventually distribute this network mapping information to the other routers. An example of how a scalable switching network can use enhanced external output connectivity is shown in FIG. 13. Traffic from input router 46 can now reach destination D via routers 46, 51, and 64; or 46, 54, and 63. This enhanced connectivity can be used for output router fault tolerance. If either output router 63 or 64 were to fail then the traffic could be diverted to the other output router. This enhanced connectivity can be used for output load balancing. This distributes the out-going traffic over several output routers and helps prevent any particular output router from becoming overloaded. This can be achieved by having routers 40–48, 50–58, and 60–68 load balance over equivalent routes. The traffic from router 46 to destination D is then divided between output routers 63 and 64. This load balancing also reduces the delay and jitter.

Figure 14:
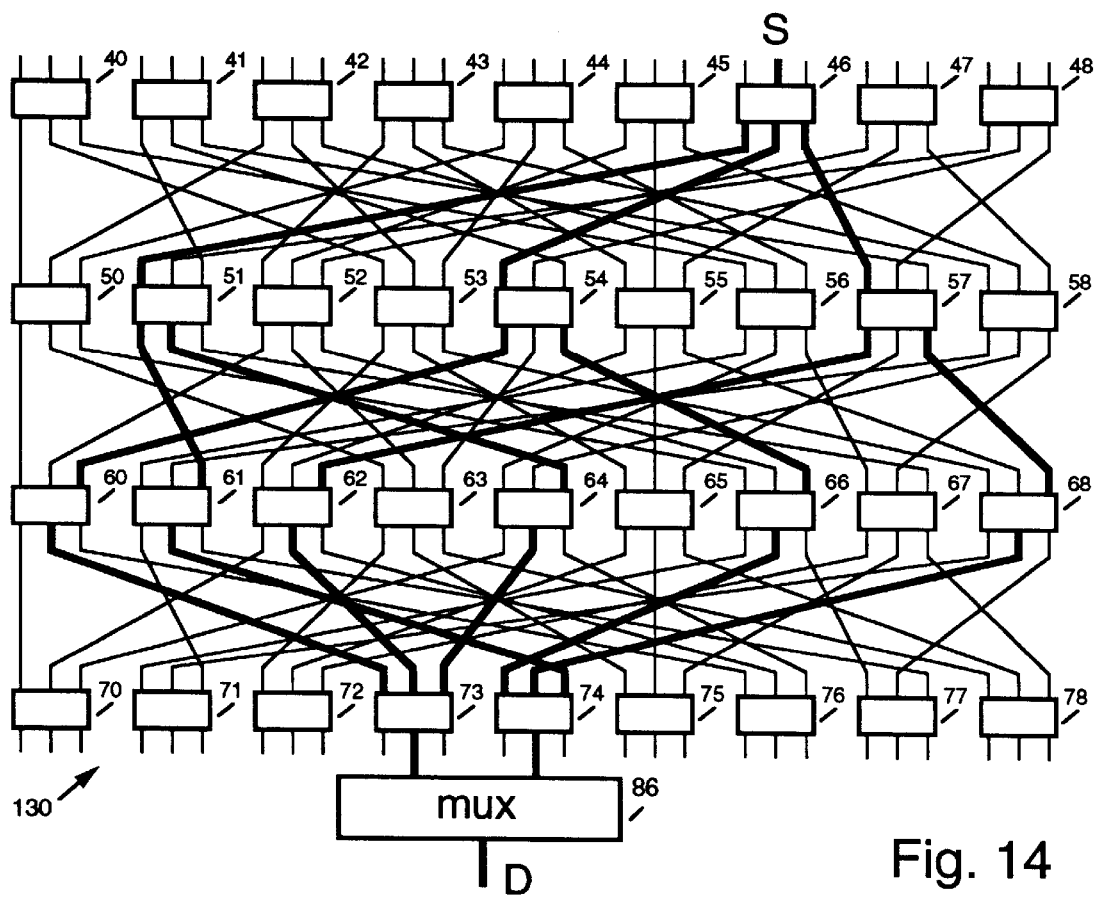
FIG. 14 is a block diagram of a scalable switching network 130 of the present invention which exploits enhanced internal and output connectivity for fault tolerance, output load balancing, and internal load balancing.

Enhanced external output connectivity combines with enhanced internal connectivity to enhance the overall connectivity. This is shown in FIG. 14. An additional level of mapping interconnect and row of routers 70–78 have been added. It is now possible to get from input router 46 to destination D connected to output multiplexer 86 by routers 46, 51, 61, and 74; 46, 51, 64, and 73; 46, 54, 60, and 73; 46, 54, 66, and 74; 46, 57, 62, and 73; and 46, 57, 68, and 74. This enhanced connectivity can be used for output load balancing, internal load balancing, output fault tolerance, internal fault tolerance, delay reduction, and jitter reduction.

Figure 15:
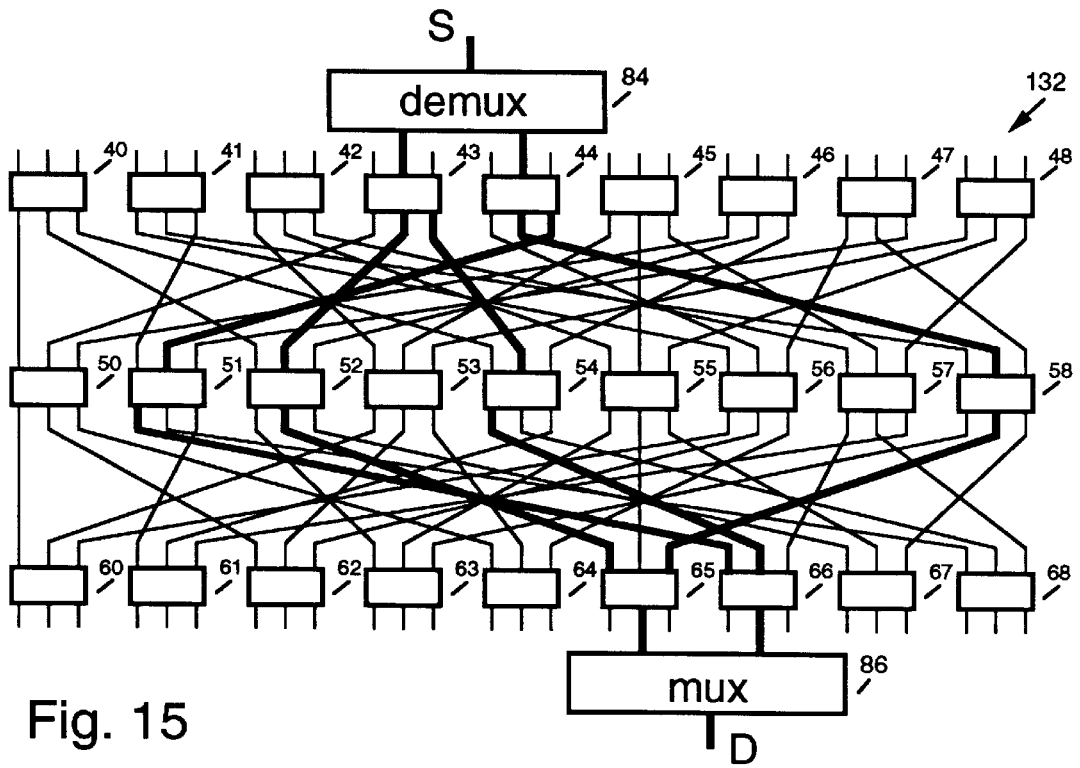
FIG. 15 is a block diagram of a scalable switching network 132 of the present invention which exploits enhanced input and output connectivity for fault tolerance, input load balancing, output load balancing, and internal load balancing.

Enhanced external input connectivity and enhanced external output connectivity can both be used to enhance the overall connectivity. This is shown in FIG. 15. Traffic from source S can now reach destination D by routers 43, 52, and 65; 43, 52, and 65; 44, 51, and 66; 44, 51, and 66; and 44, 58, and 65. This enhanced connectivity can be used for input load balancing, output load balancing, internal load balancing, input fault tolerance, output fault tolerance, internal fault tolerance, delay reduction, and jitter reduction.

Figure 16:
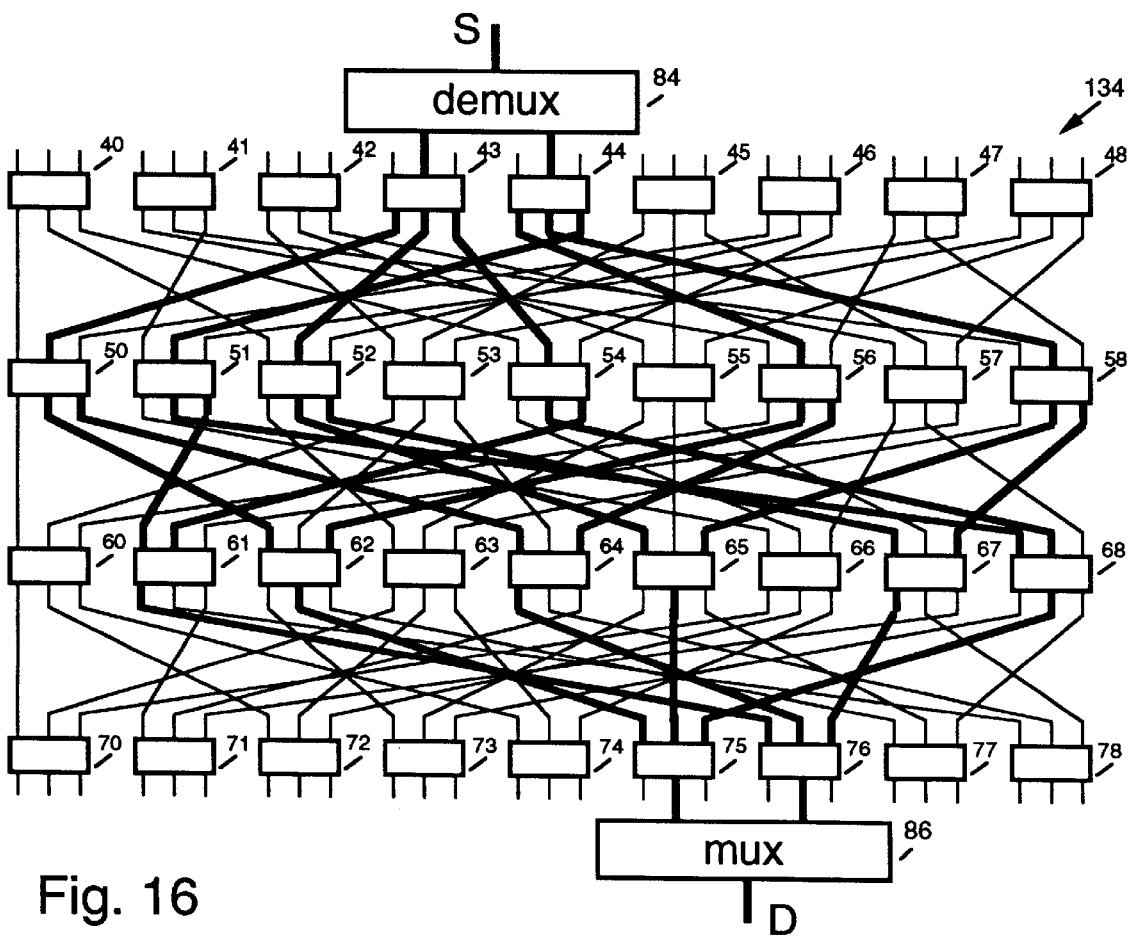
FIG. 16 is a block diagram of a scalable switching network 134 of the present invention which exploits enhanced input, internal, and output connectivity for fault tolerance, input load balancing, output load balancing, and internal load balancing.

Enhanced external input connectivity, enhanced external output connectivity, and enhanced internal connectivity can all be used to enhance the overall connectivity. This is shown in FIG. 16. Traffic from source S can now reach destination D by routers 43, 50, 62, and 75; 43, 50, 64, and 76; 43, 52, 65, and 75; 43, 52, 67, and 76; 43, 54, 61, and 76; 43, 54, 68, and 75; 44, 51, 67, and 76; 44, 51, 61, and 76; 44, 56, 62, and 75; 44, 56, 64, and 76; 44, 58, 65, and 75; 44, 58, 67, and 76. This enhanced connectivity can be used for input load balancing, output load balancing, internal load balancing, input fault tolerance, output fault tolerance, internal fault tolerance, delay reduction, and jitter reduction.

The internal and external routing algorithms of the routers which make up the scalable switching network will recognize any external input, external output, or internal enhanced connectivity and take advantage of it for fault tolerance and load balancing. Destination based routing will route traffic through such a scalable switching network. It would be difficult for path based routing to take advantage of this enhanced connectivity since its routing is usually fixed to the regular topology of the switching fabric.

The scalable switching network 80 and enhanced scalable switching network 82 can be designed to have a shared distributed output buffering capability. This helps the scalable switching network 80 and enhanced scalable switching network 82 deal with an output router buffer overload and avoids having to size the output router buffers for a worst case scenario. A TCP/IP ICMP (Internet Control Message Protocol) source quench or similar upstream flow control signal can be used to throttle back the inputs to the overloaded router. This will cause the packets to back up in the buffers of the upstream routers. If these routers start to overload they request that their upstream routers throttle back on their inputs. This backup fans out and dilutes itself. The effect is that of a shared distributed output buffer. It is important to limit the side effects of shared distributed output buffering. This can be accomplished by having each router allocate some buffer space to each port and also allocate some buffer space to be shared between all the ports. This will prevent a packet backup from shutting down a router by using up all the buffer space.

Figure 17:
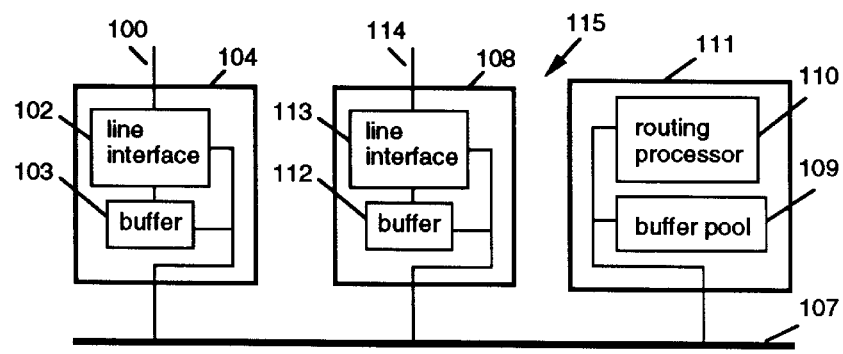
FIG. 17 is a block diagram of a router 115 with dedicated port buffers 103 and 112 and a shared buffer pool 109 used to implement a shared distributed output buffering switching network of the present invention.

A router 115 adapted for shared distributed output buffering is shown in FIG. 17. Line cards 104 and 108 contain line interfaces 102 and 113; and dedicated buffers 103 and 112. Line interface 102 is connected to port 100, dedicated buffer 103, and a common bus 107. Dedicated buffer 103 is connected to line interface 102 and common bus 107. Line interface 112 is connected to port 114, dedicated buffer 112, and common bus 107. Dedicated buffer 112 is connected to line interface 113 and common bus 107. Routing processor 110 is connected to buffer pool 109 and common bus 107. Buffer pool 109 is connected to routing processor 110 and common bus 107. Line interface 100 accepts in-coming packets and stores them in buffer 103. Routing processor reads the header of the packet stored in buffer 103, determines how it should be routed, and transfer the packet from buffer 103 to a buffer 112 associated with the proper next hop port 114.

If dedicated buffers 103 or 112 were full then line interfaces 102 and 113 and routing processor 110 would use buffer pool 109 for storage. If buffer pool 109 were to overflow then routing processor 110 would send a request to neighboring routers to temporarily reduce the packet traffic that they sent to router 115. Correspondingly, the routing processor 110 of router 115 would respond to such a request by informing the line interface connected to the requesting neighboring router to reduce the packet traffic to the router.

As an example, suppose router 74's buffers were to overflow. It would send a message upstream to routers 60, 63, and 66. These routers would then slow the rate of traffic to router 74. The buffers in routers 60, 63, and 66 dedicated to links going to router 74 would then start to back up. Routers 60, 63, and 66 would backup to the point that they would start to use buffers from their shared buffer pools. When these buffer pools overflowed, router 60 would signal upstream to routers 50, 53, and 56; router 63 would signal upstream to routers 52, 55, and 58; and router 66 would signal upstream to routers 51, 54, and 57 to ask that their traffic be reduced. Packets would then start to backup in these routers. This process would continue until routers 40–48 were also involved. Thus all the routers which make up the scalable switching networks 80 and enhanced scalable router network 82 cooperate to form a shared distributed output buffer.

Scalable switching network 80 and enhanced scalable switching network 82 are capable of non-stop operation. In order to achieve non-stop operation it is necessary to prevent packets from being lost in a failure. This is accomplished by TCP/IP's end-to-end protocol. The packets lost in a failure are not received by destination D. The destination D thus does not return an acknowledgment. The source S times out waiting for the acknowledgments associated with the lost packets. The source S then retransmits these packets. The retransmitted packets and future packets are routed around the fault. Hence, the data lost in the failure are not lost by the network.

Figure 18:
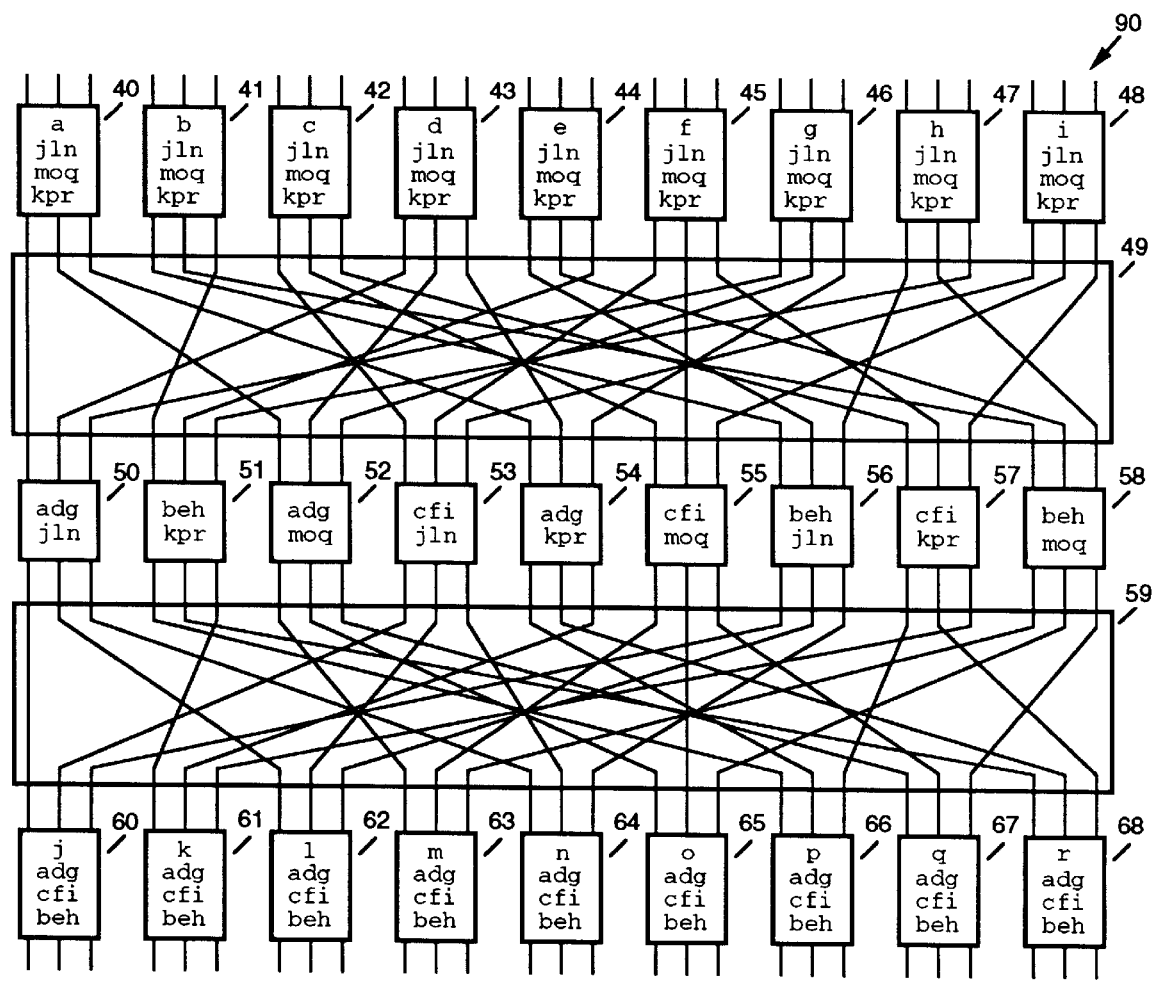
FIG. 18 is a block diagram and example of a bi-directional scalable switching network 90 of the present invention.

As discussed, the flow of packets in scalable switching network 80 in FIG. 1 was from routers 40–48 to routers 70–78. Packets can also simultaneously flow from routers 70–78 to routers 40–48 since all the connections and router ports are full duplex. Each router port can be used as both an input and output. Each mapping interconnect 49 and 59 can be used in a forward or reverse direction. A bi-directional scalable switching network 90 is shown in FIG. 18. Any router 40–48 in the first row can reach any router 60–68 in the last row, and any router 60–68 in the last row can reach any router 40–48 in the first row. The gene pools of each of the routers show this connectivity. Similarly, in the bi-directional enhanced scalable switching network 92 in FIG. 18 any of the routers 40–48 in the first row can reach any of the routers 70–78 in the last row in a redundant manner and routers 70–78 in the last row can reach any of the routers 40–48 in the first row in a redundant manner. The gene pools of each of the routers show this connectivity.

As an example of the operation of bi-directional scalable switching network 90 in FIG. 18, a packet in router 40 desiring to go to router 63 is routed via router 52. A packet in router 63 desiring to go to router 40 is also routed via router 52.

Similarly, an example of the operation of a bi-directional enhanced scalable switching network 92 is shown in FIG. 18. A packet in router 40 desiring to go to router 74 is routed via routers 52 and 63; or 50 and 60; or 54 and 66. A packet in router 74 desiring to got to router 40 is routed via routers 63 and 52; or 60 and 50; or 66 and 54.

To be completely bi-directional scalable switching network 90 and enhanced scalable switching network 92 must have the property that, any input of a router must be able to reach any output of the same router; any router in the first or last row must be able to reach any other router in the same row; and router in first row must be able to reach any router in the last row and vice versa. Any input of a router can reach any output in the same router by definition. Any router in the first row can reach any router in the last row and vice versa as previously discussed. Any of the routers 40–48 in the first row can reach any of the other routers 40–48 in the first row by first traversing the scalable router in one direction for one or more levels and then fold back in the reverse direction. Any of the routers 70–78 in the last row can reach any of the other routers 70–78 in the last row by first traversing the scalable router in one direction for one or more levels and then fold back in the reverse direction. As an example of folded routing, suppose a packet in router 40 wishes to reach router 43. It can first travel to router 52 and then reverse direction and go to 43; since router 52 has the gene d which corresponds to router 43. As another example, suppose a packet in router 40 wishes to reach router 44. It could do this by first going to routers 50 and 60 and then reversing direction to router 56 and then to 44; since router 60 has the gene e which corresponds to router 44. Thus any port in routers 40–48 and routers 70–78 can reach any port in routers 40–48 and routers 70–78.

A N input and N output, bi-directional scalable switching network 90 can be implemented with $\log_x(N/2)$ rows of (N/2)/x routers where x is the fanin of the router; since each end of the router will handle N/2 of the inputs and outputs.

Figure 19:
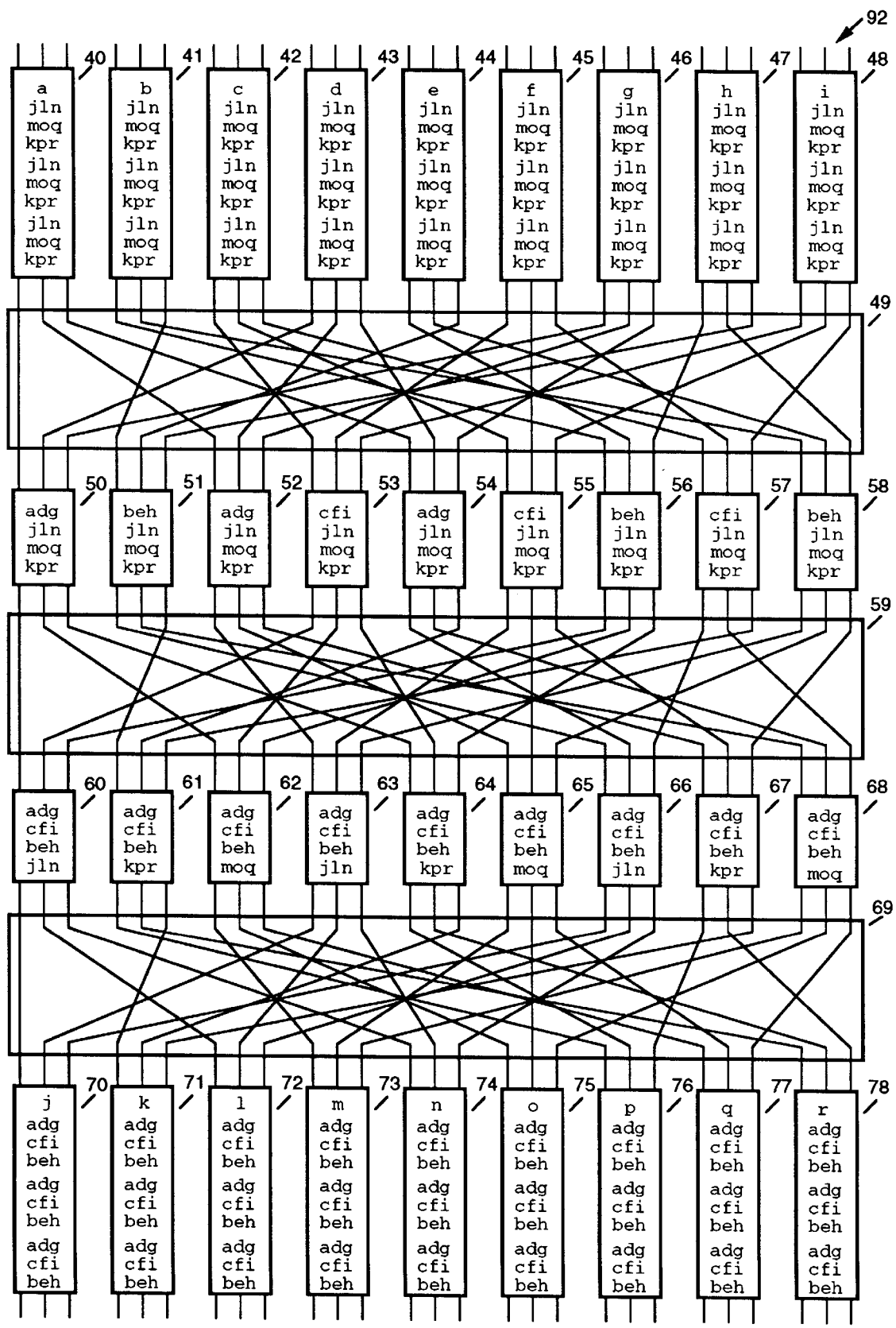
FIG. 19 is a block diagram and example of a bi-directional enhanced scalable switching network 92 of the present invention.

An enhanced bi-directional scalable switching network 92 is shown in FIG. 19. Mapping interconnect 69 and a row of routers 70–78 have been added to bi-directional switching network 90. Routers 40–78 show the bi-directional gene pools which represent the connectivity of each router. Router 56's genes behjlnmoqkpr indicate that routers 41 can reach routers 41, 44, 47, 70, 72, 74, 73, 75, 77, 71, 76, and 78. An enhanced scalable switching network 92 can be implemented with $\log_x(N/2)+1$ rows of (N/2)/x routers.

Fault tolerance, internal load balancing, input load balancing, output load balancing, delay reduction, jitter reduction, and shared distributed output buffering also apply to the bi-directional scalable switching networks and bi-directional enhanced scalable switching networks.

Auspicious assignment of the ports of various routers helps reduce the traffic load of the bi-directional scalable router since some ports are closer to other ports in of terms router hops. Heavily used through traffic should be paired on the same router to reduce the levels of routing needed to route the packet. As an example, suppose a large amount of traffic went from New York to Chicago. The incoming line from New York should be connected to router 40 along with the outgoing line to Chicago. All the New York to Chicago traffic could then be directly handled by router 40.

While the scalable switching network 80 and enhanced scalable switching network 82 require more hardware than bi-directional scalable switching network 90 and bi-directional enhanced scalable switching network 92 respectively; scalable router 80 and enhanced scalable switching network 82 have a greater throughput and bi-sectional bandwidth which is desirable in heavy traffic situations.

It is important to be able to initialize, monitor, and update the scalable switching network. This can be accomplished by accessing the individual routers in the scalable switching network via TCP/IP. BOOTP (Bootstrap Protocol) can be used to initialize each router and SNMP (Simple Network Management Protocol) can be used to access each router's state information from anywhere on the local area network, wide area network, or the Internet. Other TCP/IP based protocols such as rlogin, telnet, FTP (file Transfer Protocol), and NFS (Network File System) can also be supported if desired.

The function of the mapping between the rows of routers is to mix the gene pools of the routers from level to level. If there is insufficient mixing of the gene pools then additional levels of mapping and routers will be needed to insure a complete gene pool. Such a case is shown in FIG. 4 where routers 10–25 with a fanin of 4 are used to route 16 inputs. Router 10 is connected to routers 14 and 15. Router 11 is connected to routers 16 and 17. Router 12 is connected to router 14 and 15. Router 13 is connected to routers 16 and 17. Router 14 is connected to router 18 and 19. Router 15 is connected to router 20 and 21. Router 16 is connected to router 18 and 19. Router 17 is connected to router 20 and router 21. Router 18 is connected to router 22 and 23. Router 19 is connected to router 24 and 25. Router 20 is connected to router 22 and 23. Router 21 is connected to router 24 and 25.

The problem can be seen in the second row of routers 14–17. The perfect shuffle mapping interconnect mixes only two different genes in each router. This mixing takes three rows of routers and two levels of mapping interconnects to form a complete gene pool and four levels of routers, and three levels of mapping interconnect to form a redundant gene pool.

The source of the problem is that the multiple inputs and outputs of a router introduce a blocking or grouping factor which degrades the mixing capability of the perfect shuffle mapping interconnect. It is important to find a way to compensate for this blocking factor. This can be accomplished by using a cyclic group generator with a sufficient stride to avoid multiple connections to the same router. There is a further complication in that the larger stride can also generate sub-groups which also degrade the mixing power of the mapping interconnect.

The blocking compensated mapping shown in FIG. 5 provides a sufficient mixing to completely route 16 inputs with two levels of routing and one level of mapping interconnect. Enhanced connectivity routing can be accomplished with three levels of routers 26–29, 30–33, and 34–37; and two levels of mapping. Router 26 is connected to routers 30, 31, 32, and 33. Router 27 is connected to routers 30, 31, 32, and 33. Router 28 is connected to routers 30, 31, 32, and 33. Router 29 is connected to routers 30, 31, 32, and 33. Router 30 is connected to routers 3 4, 3 5, 3 6, and 37. Router 31 is connected to routers 34, 35, 36, and 37. Router 32 is connected to routers 34, 35, 36, and 37. Router 33 is connected to routers 34, 35, 36, and 37.

Figure 6:
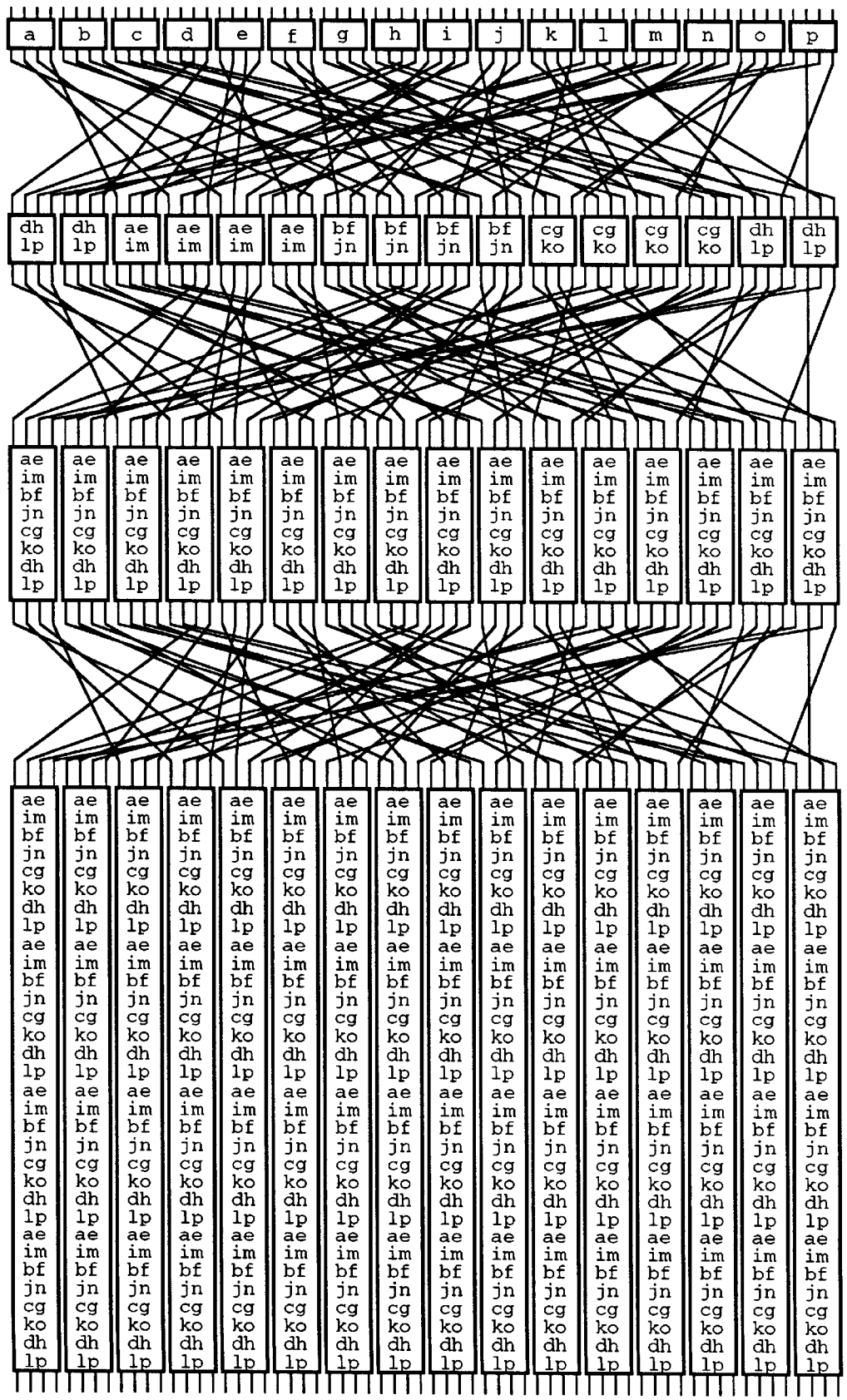
FIG. 6 is a block diagram of a 64 input, enhanced scalable switching network of the present invention having 4 rows of routers and 3 levels of mapping interconnect; where each row has 16 routers and where each router has a fanin and fanout of 4.

An example for 64 inputs is shown in FIG. 6. Complete routing is accomplished in three levels of routing and two levels of mapping interconnect. Enhanced connectivity is accomplished in four levels of routing and three levels of mapping. This corresponds to $\log_x N$ levels for routing and $\log_x N+1$ levels for enhanced connectivity, where x is the fanin and fanout of each router. A conventional approach such as a Bayan network requires $\log_2 N = \log_2 64 = 6$ levels of routing. The blocking compensated switching network of the present invention requires $\log_x N = \log_4 64 = 3$ levels. This is a savings of 3 levels. In fact, $\log_x N$ levels can be shown to be the theoretic minimum needed for routing.

In a switching fabric, the topology of the fabric provides both a simple path based routing algorithm and a sufficient mixing capability. Switching fabrics other than a crossbar are usually not defined for an odd number of inputs. The topology of such a network can produce a sufficient mix of the inputs, but the associated path based routing algorithm gets complicated if the topology is not regular. Destination based routing does not depend on having a fabric with nice mathematical properties. It can use fabrics with either an even or odd number of inputs. The only requirement on the fabric in a destination based scalable switching network is that it can provide a sufficient mix. An example of a scalable router with an odd number of inputs is shown in FIG. 1. The middle input is treated just like any other input.

A link or router failure can disrupt the regular topology of a network. Enhanced connectivity can also disrupt the regular topology of a network. It would be difficult for a path based routing algorithm to route through either a damaged or enhanced network. A destination based algorithm cares only about the set of destinations that its neighbors can reach.

The mixing of the mapping interconnects combined with the pooling operation of routers determines the number of levels of router which are necessary. If the number of inputs is an integer power of the fanin, then the mapping needs to form a complete cyclic group between the rows of routers. A complete permutation tour is not needed. The mapping interconnect need only provide an orthogonal mixing for $\log_x N-1$ levels. If the number of inputs is not an integer power of the fanin, then a complete cyclic permutation group is not required and a smoothed version of some sub-groups will be sufficient.

A C program to find complete cyclic groups and smoothed sub-groups with sufficient cyclic mixing capabilities for a given number of inputs for a given router fanin is shown in FIGS. 20, 21, and 22. fanin is defined as the fanin of each router, N is defined as the number of inputs, and mgene is the next integer power of the fanin which is greater than N. The rows of arrays A and B represent the various routers in a row. The columns of arrays A and B represent the gene pools of these routers. The gene pools of the routers represented by the rows of array A are each initialized with a distinct gene. Subroutine gen1 is used to generate a possible mapping interconnect. This mapping interconnect is used to transfer the genes from array A's routers to array B's routers. The genes from array B's routers are then directly transferred to array A's routers. This process is repeated $\log_{fanin} N-1$ times to simulate the actions of a scalable router with $\log_{fanin} N$ levels of routing and $\log_{fanin} N-1$ mapping interconnects. The mapping interconnect is printed if the gene pool of all of array B's routers are complete. This process is repeated for other possible mappings.

Figures 23, 24, 25:
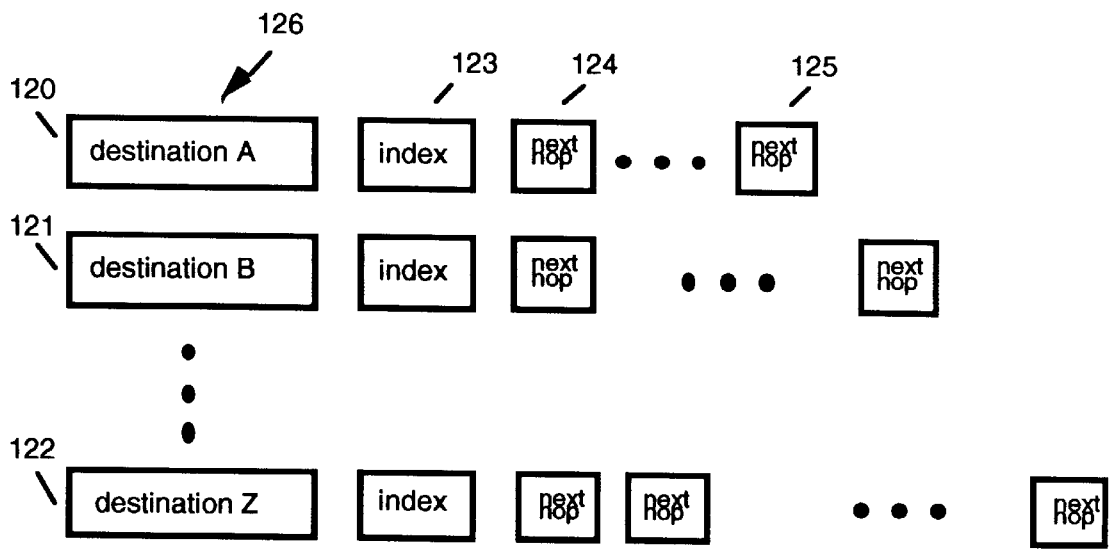
FIG. 23 shows symmetric mapping interconnects for 27 inputs and routers with a fanin of 3; generated and tested by the computer program of the present invention shown in FIGS. 20, 21, and 22.
FIG. 24 shows asymmetric mapping interconnects for 27 inputs and routers with a fanin of 3; generated and tested by the computer program of the present invention shown in FIGS. 20, 21, and 22.
FIG. 25 is a block diagram of a routing table 126 of the present invention for a plurality of destinations 120, 121, and 122 where each destination entry consists of the next hops 124 and 125 for all the equivalent routes to that destination and an index 123 which is used to select the next hops for the destination in an alternating manner.

Subroutines gen1 and gen2 are shown in FIG. 22. Subroutine gen1 generates possible symmetric mapping interconnects while subroutine gen2 generates possible asymmetric mappings. Both gen1 and gen2 use a next available router algorithm to smooth out some of the sub-groups which are generated. A sample of the output produced by gen1 for 27 inputs and routers with a fanin of 3 is shown in FIG. 23. A sample of the output produced by gen2 is shown in FIG. 24.

Figure 26:
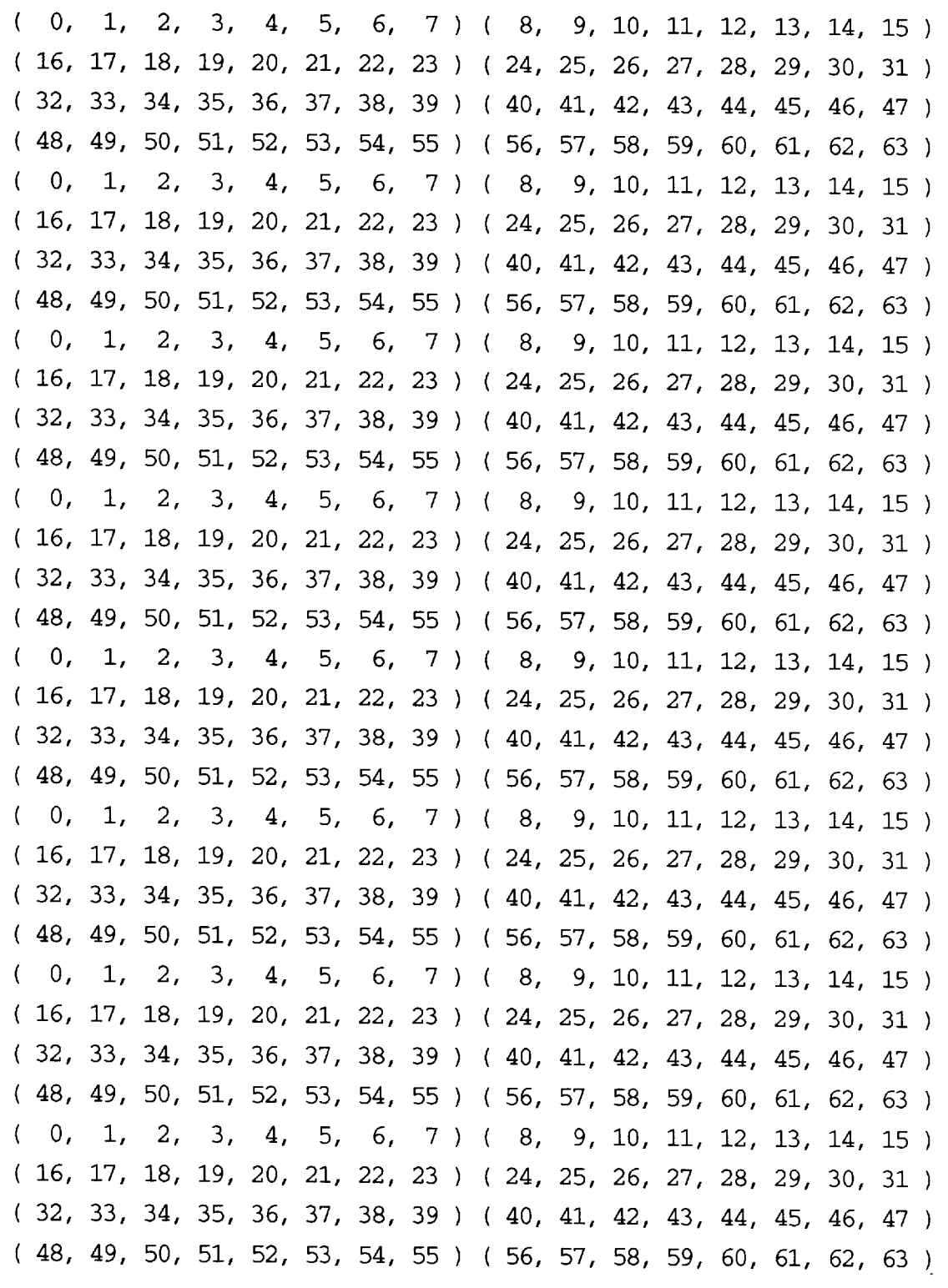

A 512 port mapping for routers with a fanin of 8 is shown in FIG. 26. This mapping can be used with 3 rows of 64 routers to build a scalable switch capable of handling 512 inputs. If each input is a 100 Mb/s Fast Ethernet (100BASE-T), and the routers were similar to a Cisco 7500 or a Bay Networks 28115 then this scalable switching network could handle 51.2 Gb/s. The 512 port mapping for a fanin of 8 can also be used with 3 rows of 64 routers to build a bi-directional scalable switching capable of handling 1024 inputs.

A mapping interconnect can be altered by using a blocking factor equivalent. This relies on the fact that all the ports on a router are equivalent. The mapping can also be altered via an isomorphic re-labeling. The i-th top and bottom port of a mapping interconnect can be re-positioned anywhere in the mapping so long as the associated connections are preserved. The mapping can also be altered by a cyclic rotation of the second row of routers relative to the first. The mapping can also be altered by flipping them over and using the top ports as the bottom ports and vice versa.

The full functionality of TCP/IP is not needed to perform the routing for a scalable router. A scalable router can be implemented with modules with this reduced functionality. The routing for a scalable router requires only a table lookup at each router to determine the next hop towards the desired destination.

Internal load balancing, input load balancing output load balancing, reduced packet delay, and reduced packet jitter require a load balancing between equivalent routes. This requires a routing table 126 as shown in FIG. 25. The routing table 126 consists of a list of destinations 120, 121, and 122 where each destination has an index 123 and a list of the next hop of equivalent routes 124 and 125 to that destination. Load balancing over equivalent routes also requires a means of using the index associated with the desired destination to select in an alternating manner one of the next hops from the list of next hops of equivalent routes associated with the desired destination. It also requires a means for changing the index. As an example, suppose a packet wishes to be routed to destination A. Routing table 126 is consulted and entry 120 is found. The entry consists of index 123 and a list of next hops, such as 124 and 125, along equivalent routers to destination A. The index is used to select one of the next hops. The index 123 is then updated to point to another possible next hop to destination A. The next packet desiring to go to destination A then takes a different equivalent route and thus load balances the traffic.

Fault tolerance requires that a router be able to perform dynamic routing. This requires that a router be able to detect a change in its ability to reach a neighboring router, to update its routing table to reflect this change, to broadcast its routing table to other routers, and to update its routing table with information from the routing tables of other routers.

Distributed output buffering requires that a router be able to detect a shared buffer pool overflow condition; to signal neighboring routers to reduce the packet flow; and to reduce packet flow to a requesting router upon receipt of a request to reduce the packet flow. It also requires an ability to switch from dedicated port buffers to the shared pool buffers when the dedicated port buffers are all filled.

The end-to-end protocol which protects packets in transit and provides non-stop operation can be provided by any end-to-end protocol with re-transmit on a timed-out acknowledgment. Non-stop operation can also be achieved by a link-to-link re-transmit on timed-out acknowledgment protocol instead of an end-to-end protocol. In this case router 43 keeps a copy of a packet sent to router 52 and starts a timer when the packet was sent. Router 52 sends an acknowledgment back to router 40 if the packet was properly received. Router 40 re-transmits the packet if an acknowledgment was not received within a fixed time-out interval. This process would be repeated between each router along a given path though the scalable switching network.

The updating of the routing tables 126 can be performed in either real time or off-line; in either a local or remote manner; and in either a centralized or distributed manner.

Full duplex mapping interconnections and router ports are not necessary. Independent inputs and outputs can be used with additional mapping interconnects. The interconnects can be copper wires or optical fiber. The interconnects can also be parallel or fast serial.

The routers can be commercial routers such as a CISCO 7500 or a Bay Networks 28115. The routers can also be implemented with a PC or workstation running a UNIX, LINUX, Microsoft NT, or similar operating system. The routers can also be built with digital logic, memory, and processor integrated circuits.

The techniques taught for $\log_{fanin}$ N level routing, bi-directional $\log_{fanin}$ (N/2) level routing, fault tolerance, internal load balancing, input load balancing, output load balancing, and shared distributed output buffering can be used to build computer or telecommunication switching networks. The packets can be of any size and format such as IP, ATM, or X.25.

The techniques taught for $\log_{fanin}$N level routing, bi-directional $\log_{fanin}$(N/2) level routing, fault tolerance, internal load balancing, input load balancing, output load balancing, and shared distributed output buffering can be used to build telecommunication switching networks. The time slots of a time division, or time and space division switching network can be stored in the data portion of a packet and the desired time slot on the desired out-going line can be used to construct the packet address. The data frames of a frame relay switching network can be stored in the data portion of a packet and the desired frame number on the desired out-going line can be used to construct the packet address.

There are several benefits to building a scalable router from standard off-the-shelf routers. It reduces development cost. It reduces the production cost via economies of scale. It protects a customer's hardware and software investment. It reduces the risk of obsolescence.

Although the present invention has been described above in terms of specific embodiments, it is anticipated that alteration and modifications thereof will no doubt become apparent to those skilled in the art. It is therefore intended that the following claims be interpreted as covering all such alterations and modifications as falling within the true spirit and scope of the invention.

I claim:

1. A N input and N output, scalable switching network comprising:

$\log_x$ N rows of N/x routers including a first row and a last row, where each router has (a) x top ports, (b) x bottom ports, and (c) a destination based routing means;

$\log_x$ N −1 levels of equivalent blocking compensated cyclic group based mapping interconnects each with N upper ports and N lower ports; wherein the top ports of all except for the first row of routers are connected to lower ports of a mapping interconnect;

the bottom ports of all except for the last row of routers are connected to upper ports of a mapping interconnect; and the top ports of the first row of routers are the N inputs of the scalable switching network and the bottom ports of the last row of routers are the N outputs of the scalable switching network.

2. The apparatus of claim 1 wherein each router supports TCP/IP (Transmission Control Protocol/Internet Protocol).

3. The apparatus of claim 1 wherein each router supports BOOTP (Bootstrap Protocol) and SNMP (Simple Network Management Protocol).

4. The apparatus of claim 1 wherein each router supports ATM (Asynchronous Transmission Mode) protocol.

5. A N input and N output, bi-directional scalable switching network comprising:

$\log_x$ (N/2) rows of (N/2)/x destination based routers, including a first row and a last row, where each router has (a) x top ports, (b) x bottom ports, and (c) a destination based routing means;

$\log_x$ (N/2)−1 levels of equivalent blocking compensated cyclic group based mapping interconnects each with N/2 upper ports and N/2 lower ports; wherein the top ports of all except for the first row of routers are connected to lower ports of a mapping interconnect;

the bottom ports of all except for the last row of routers are connected to upper ports of a mapping interconnect; and the N/2 top ports of the first row of routers and the N/2 bottom ports of the last row of routers are the N inputs and the N outputs for the bi-directional scalable switching network.

6. The apparatus of claim 5 wherein each router supports TCP/IP (Transmission Control Protocol/Internet Protocol).

7. The apparatus of claim 5 wherein each router supports BOOTP (Bootstrap Protocol) and SNMP (Simple Network Management Protocol).

8. The routers of claim 5 wherein each router supports ATM (Asynchronous Transmission Mode) protocol.

9. A switching network having a characteristic from the set of characteristics comprising input load balancing, internal load balancing, output load balancing, delay reduction, and jitter reduction, said network comprising:

a plurality of rows of routers including a first row and a last row, where each router has (a) a plurality of top ports and bottom ports, (b) a destination based routing means, and (c) an equivalent route load balancing means;

a plurality of equivalent mapping interconnects each with a plurality of upper ports and lower ports, where the upper ports of each mapping interconnect are connected to the lower ports of said mapping interconnect in a predetermined manner; wherein the top ports of all except for the first row of routers are connected to lower ports of a mapping interconnect;

the bottom ports of all except for the last row of routers are connected to upper ports of a mapping interconnect; and portions of the top ports of the first row of routers and the bottom ports of the last row of routers are inputs and outputs for the switching network.

10. The network of claim 9 wherein each said equivalent route load balancing means has a routing table with entries corresponding to destinations of data that pass through the corresponding router, wherein each entry comprises a list of the next hops of equivalent routes to that destination and an index which is used to select from among the next hops in a predetermined manner.

11. The network of claim 9 wherein each router supports TCP/IP (Transmission Control Protocol/Internet Protocol).

12. The network of claim 9 wherein each router supports ATM (Asynchronous Transmission Mode) protocol.

13. A fault tolerant switching network having a plurality of inputs and outputs, said network comprising:

a plurality of rows of routers including a first row and a last row, where each router has (a) a plurality of top ports and bottom ports, (b) a destination based routing means, (c) an equivalent route load balancing means, and (d) a dynamic routing means;

a plurality of equivalent mapping interconnects each with a plurality of upper ports and lower ports where the upper ports of the mapping interconnect are connected to the lower ports of said mapping interconnect in a predetermined manner; wherein the top ports of all except for the first row of routers are connected to lower ports of a mapping interconnect;

the bottom ports of all except for the last row of routers are connected to upper ports of a mapping interconnect; and portions of the top ports of the first row of routers and the bottom ports of the last row of routers are the inputs and the outputs of the switching network.

14. The network of claim 13 wherein each router supports TCP/IP (Transmission Control Protocol/Internet Protocol).

15. The network of claim 13 wherein each router supports ATM (Asynchronous Transmission Mode) protocol.

16. A switching network having shared distributed output buffering and a plurality of inputs and outputs, said network comprising:

a plurality of rows of routers including a first row and a last row, where each router has (a) a plurality of top ports and bottom ports, (b) a destination based routing means, and (c) a flow control means;

a plurality of equivalent mapping interconnects each with plurality of upper ports and lower ports where the upper ports of each mapping interconnect are connected to the lower ports of said mapping interconnect in a predetermined manner; wherein the top ports of all except for the first row of routers are connected to lower ports of a mapping interconnect;

the bottom ports of all except for the last row of routers are connected to upper ports of a mapping interconnect; and portions of the top ports of the first row of routers and the bottom ports of the last row of routers are the inputs and the outputs for the switching network.

17. The network of claim 16 wherein each router supports TCP/IP (Transmission Control Protocol/Internet Protocol).

18. The network of claim 16 wherein each router supports ATM (Asynchronous Transmission Mode) protocol.

19. The network of claim 16 wherein each router port has access to both its own buffers and to a shared pool of buffers.

* * * * *